(12) United States Patent
Chin et al.

(10) Patent No.: US 9,177,592 B2
(45) Date of Patent: *Nov. 3, 2015

(54) SYSTEMS AND METHODS FOR ATOMIC FILM DATA STORAGE

(71) Applicant: Elwha, LLC, Bellevue, WA (US)

(72) Inventors: Hon Wah Chin, Palo Alto, CA (US); Howard Lee Davidson, San Carlos, CA (US); Roderick A. Hyde, Redmond, WA (US); Jordin T. Kare, Seattle, WA (US); Nicholas F. Pasch, Bellevue, WA (US); Robert C. Petroski, Seattle, WA (US); David B. Tuckerman, Lafayette, CA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/013,828

(22) Filed: Aug. 29, 2013

(65) Prior Publication Data

US 2015/0067707 A1    Mar. 5, 2015

(51) Int. Cl.

| | | |
|---|---|---|
| *G11B 5/74* | (2006.01) |
| *G11B 5/09* | (2006.01) |
| *G11B 5/64* | (2006.01) |
| *G11B 7/24035* | (2013.01) |
| *G11B 7/2548* | (2013.01) |
| *G11B 23/00* | (2006.01) |

(52) U.S. Cl.
CPC .......... *G11B 7/24035* (2013.01); *G11B 7/2548* (2013.01); *G11B 23/0057* (2013.01); *G11B 23/0064* (2013.01); *G11B 23/0078* (2013.01)

(58) Field of Classification Search
CPC ........... G11B 23/0064; G11B 23/0057; G11B 23/0078; G11B 5/72; G11B 5/74; G11B 5/743; G11B 5/746; G11B 5/855; G11B 7/254; G11B 7/2548; A01B 12/006; B82Y 10/00; B82Y 99/00; G11C 13/025; G11C 2213/35; G11C 7/00; H01F 10/005; H01F 1/401; H01F 1/405; H01L 29/685; Y10T 428/24149; Y10T 428/24273; Y10T 428/24298; Y10T 428/24306; Y10T 428/24322; Y10T 428/24331; Y10T 428/25
See application file for complete search history.

(56) References Cited

U.S. PATENT DOCUMENTS

| 4,878,213 | A | 10/1989 | Kazan et al. |
| 7,636,214 | B2 * | 12/2009 | Imada et al. ..................... 360/48 |
| 7,735,147 | B2 | 6/2010 | Jin et al. |
| 8,105,565 | B2 | 1/2012 | Nishikawa et al. |
| 8,189,302 | B2 | 5/2012 | Gurney et al. |
| 8,785,261 | B2 | 7/2014 | King |
| 2002/0001261 | A1 * | 1/2002 | Matsui et al. .............. 369/30.07 |
| 2006/0286345 | A1 | 12/2006 | Nakao |

(Continued)

*Primary Examiner* — Dionne Pendleton

(57) ABSTRACT

The present disclosure provides systems and methods associated with data storage using atomic films, such as graphene, boron nitride, or silicene. A platter assembly may include at least one platter that has one or more substantially planar surfaces. One or more layers of a monolayer atomic film, such as graphene, may be positioned on a planar surface. Data may be stored on the atomic film using one or more vacancies, dopants, defects, and/or functionalized groups (presence or lack thereof) to represent one of a plurality of states in a multi-state data representation model, such as a binary, a ternary, or another base N data storage model. A read module may detect the vacancies, dopants, and/or functionalized groups (or a topographical feature resulting therefrom) to read the data stored on the atomic film.

12 Claims, 21 Drawing Sheets

(56) References Cited

U.S. PATENT DOCUMENTS

| | | |
|---|---|---|
| 2008/0014426 A1 | 1/2008 | Nishikawa et al. |
| 2008/0212445 A1* | 9/2008 | Maehasi .................. 369/94 |
| 2009/0195939 A1 | 8/2009 | Gurney et al. |
| 2009/0285082 A1 | 11/2009 | Ko et al. |
| 2010/0205623 A1 | 8/2010 | Molaro et al. |
| 2011/0151278 A1 | 6/2011 | Gurney et al. |
| 2011/0186947 A1* | 8/2011 | Liu .............................. 257/421 |
| 2012/0063033 A1 | 3/2012 | Gurney et al. |
| 2012/0074510 A1 | 3/2012 | Sasaki et al. |
| 2012/0171451 A1 | 7/2012 | Nishikawa et al. |
| 2012/0211848 A1 | 8/2012 | Sasaki et al. |
| 2012/0236622 A1 | 9/2012 | Badger et al. |
| 2013/0223166 A1* | 8/2013 | Schuette ................ 365/189.16 |
| 2014/0027715 A1 | 1/2014 | Mehr et al. |
| 2014/0079936 A1 | 3/2014 | Russo et al. |
| 2014/0127534 A1* | 5/2014 | Winarski ..................... 428/848 |

* cited by examiner

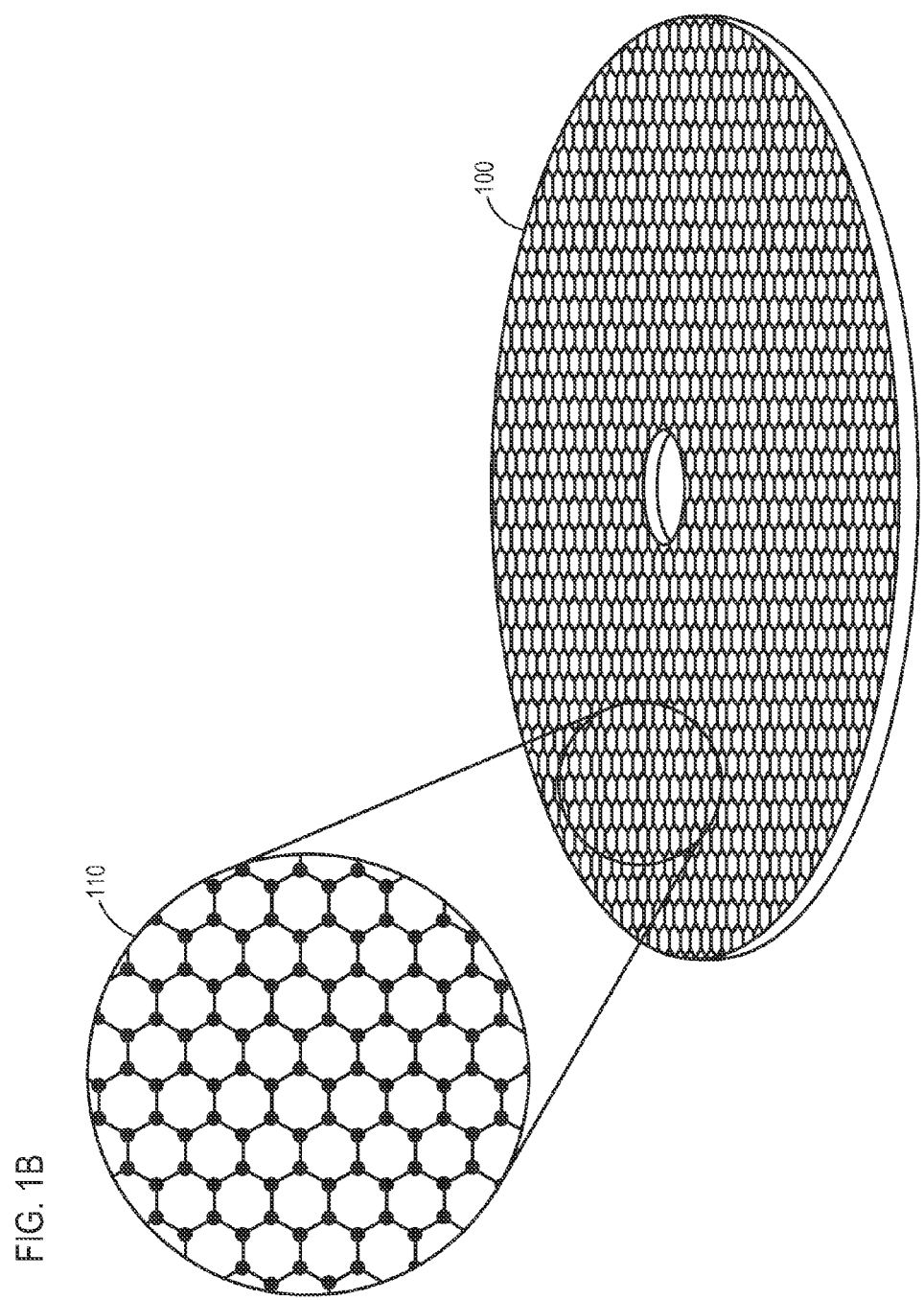

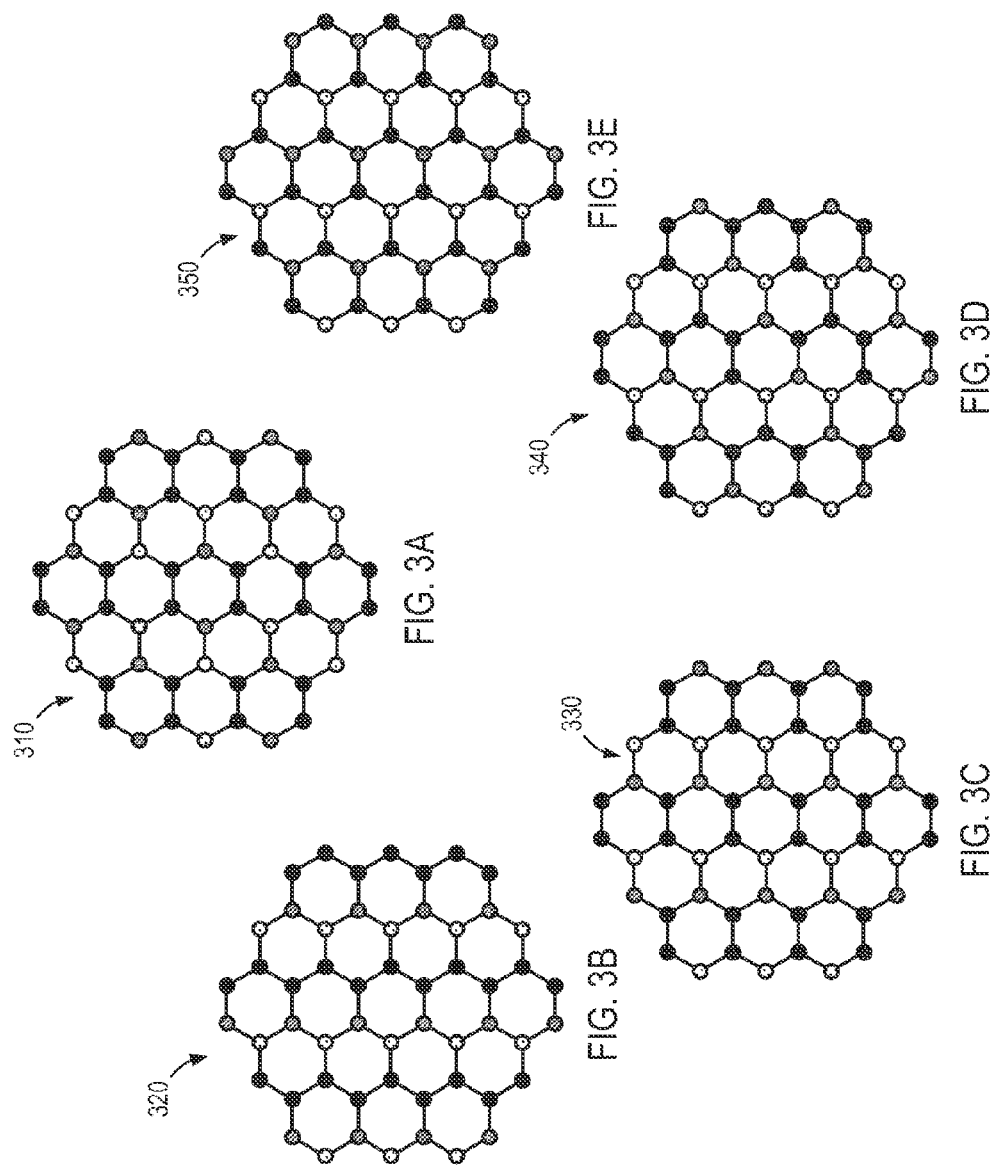

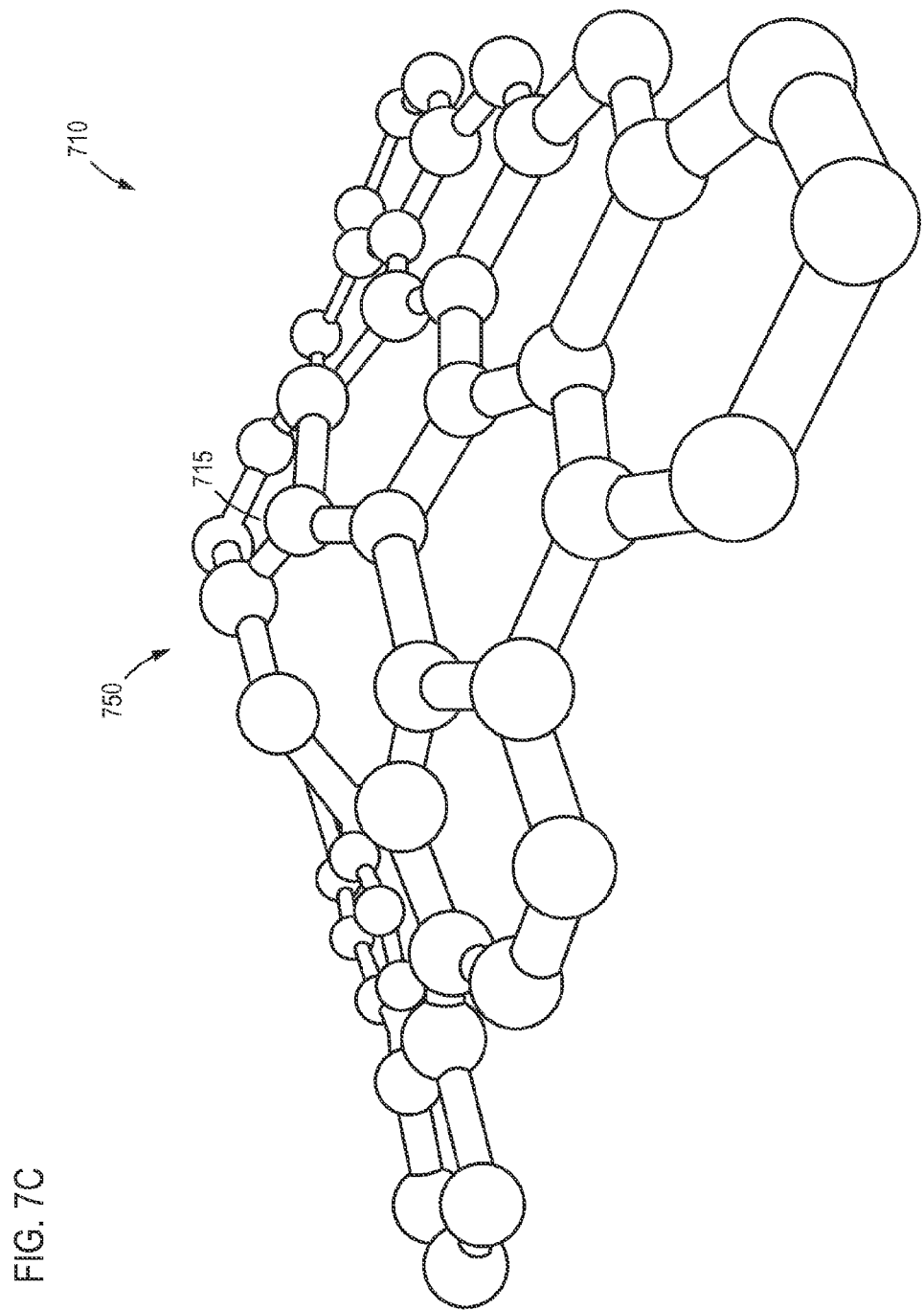

SYSTEMS AND METHODS FOR ATOMIC FILM DATA STORAGE

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 14/013,836, titled "Systems and Methods for Atomic Film Data Storage," naming Hon Wah Chin, Howard Lee Davidson, Roderick A. Hyde, Jordin T. Kare, Nicholas F. Pasch, Robert C. Petroski, David B. Tuckerman, Lowell L. Wood, Jr. as inventors, filed 29 Aug. 2013, is related to the present application.

U.S. patent application Ser. No. 14/013,845, titled "Systems and Methods for Atomic Film Data Storage," naming Hon Wah Chin, Howard Lee Davidson, Roderick A. Hyde, Jordin T. Kare, Nicholas F. Pasch, Robert C. Petroski, David B. Tuckerman, Lowell L. Wood, Jr. as inventors, filed 29 Aug. 2013, is related to the present application.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This disclosure relates to atomic film data storage. More specifically, this disclosure relates to systems and methods for storing data using one or more of vacancies, dopants, defects, or functional groups in conjunction with an atomic film to represent bits of data storage. Examples of monolayer atomic films include graphene, hexagonal boron nitride, and silicene.

SUMMARY

The present disclosure provides various systems and methods associated with data storage using atomic films, such as monolayer atomic films having uniform lattice structures. Examples of atomic films include graphene, hexagonal boron nitride, and silicene. As provided herein, various other atomic films having uniform lattice structures may be utilized as well. In some embodiments, a platter assembly may include at least one platter that has one or more substantially planar surfaces. One or more layers of a monolayer atomic film may be positioned on a planar surface and used to store data. For instance, a graphene film may be positioned on at least a portion of a substantially planar surface of a platter assembly.

In some embodiments, vacancies in the lattice structure of the atomic film may represent one or more possible states, such as for example a 0 or a 1 in a binary data storage system. In some embodiments, one or more dopants may be positioned in the lattice structure to represent one or more possible states. Similarly, a functional group on the lattice structure of the monolayer atomic film may be used to represent one or more possible states. In some embodiments, the monolayer atomic film may be fully functionalized and the removal of functional groups may be used to represent one or more possible states. In some embodiments, one or more lattice defects may be used to represent one or more possible states.

A read module may be configured to detect an anomaly in a lattice structure that represents (alone or in combination with other anomalies) bits of data. For example, a lattice anomaly may include one or more of a vacancy in a lattice structure, a dopant in a lattice structure, a defect in the lattice structure, and/or the presence of a functionalized group on the monolayer atomic film. As described above, one or more vacancies, dopants, defects, and/or functionalized groups (presence or lack thereof) may be used to represent one of at least two possible states (e.g., as bits of data storage). Thus, the monolayer atomic film may be used to store readable data in the at least two possible states that can be detected/read by a read module.

Additionally, a movement assembly may move at least one of the read module and the platter assembly with respect to the other. For instance, the platter assembly may be a disk that rotates with respect to a read module. In one embodiment, the read module and the platter assembly may be configured to function similar to single- or multi-platter magnetic disk drives, optical media, and or tape drive storage.

An example embodiment includes a graphene film deposited on a planar surface of a platter. One or more of vacancies, dopants, defects, and/or functionalized groups may be used to represent 0s and 1s for binary data storage. The platter may then be read by a read module configured to detect the vacancies, dopants, defects, and/or functionalized groups. In various embodiments, a write module may be configured to write 0s and 1s by adding and/or removing vacancies, dopants, lattice defects, and/or functionalized groups.

In some embodiments, the write module may or may not have erase/reset capabilities. Depending on the functionalities and granularity of the write module, various techniques used for solid state memory devices, such as erase blocks larger than individual sectors, may be utilized to allow relatively larger regions of the graphene layer (or other monolayer atomic film) to be erased (i.e., remove all vacancies, remove dopants, remove defects, remove functionalized groups, and/or re-functionalize the entire region). In some embodiments a block of data may be virtually erased by removing its location from a data file listing locations of stored data, or by adding its location to a data file listing unused locations.

BRIEF DESCRIPTION OF THE DRAWINGS

FIG. 1B illustrates a close-up view of the hexagonal lattice structure of the monolayer atomic film of FIG. 1A.

FIGS. 3A-3E illustrate various embodiments of hexagonal monolayer atomic films.

FIG. 7C illustrates a topographical feature (a protrusion) used to represent one or more possible states.

DETAILED DESCRIPTION

Figure 1A:
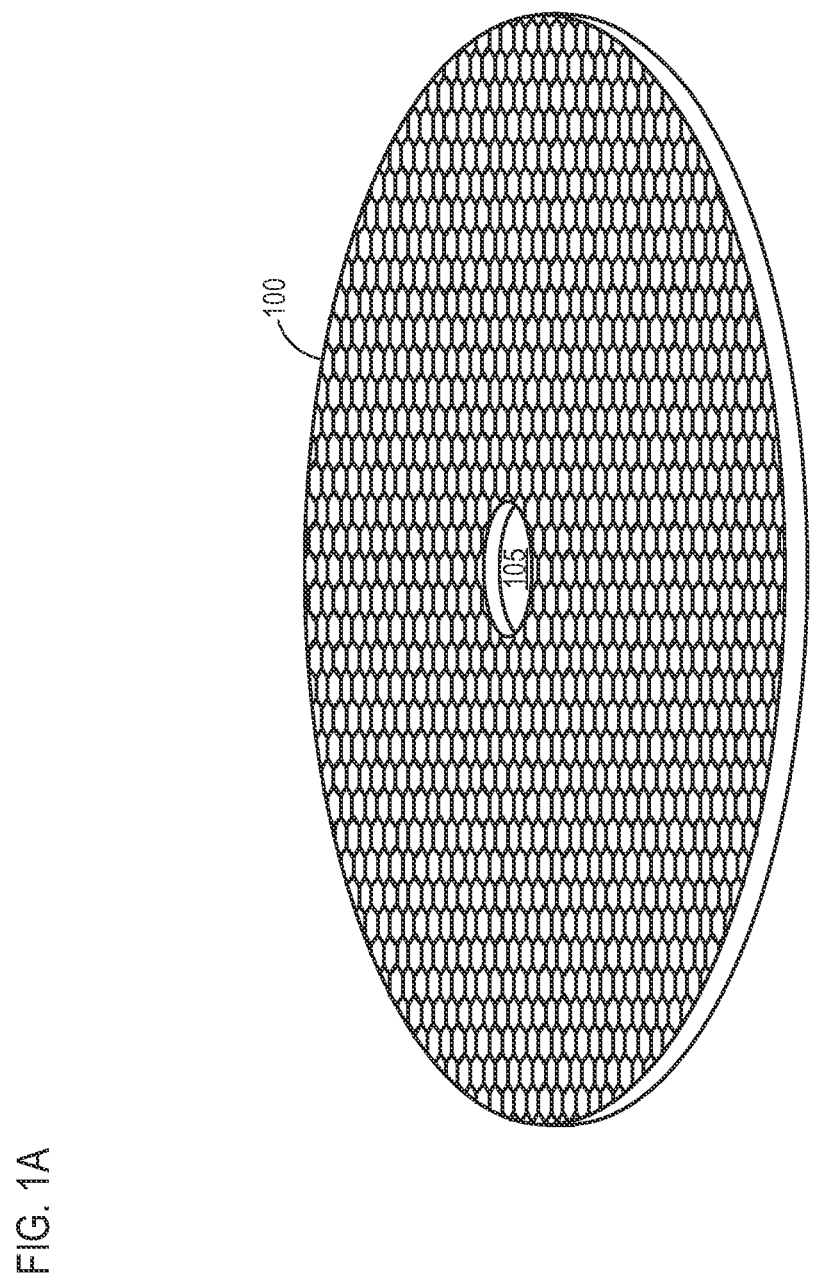
FIG. 1A illustrates a substantially planar surface of a platter with a monolayer atomic film having a hexagonal lattice structure.

According to the various embodiments described herein, data may be stored using a monolayer atomic film, such as graphene, hexagonal boron nitride, or silicene. Modifications to the lattice structure of the monolayer atomic film may be used to represent one or more states in a multi-state data representation system. For example, a dopant or doped region may be used to represent a 1 in a binary data representation system and an un-doped region or normal lattice point may be used to represent a 0 in the binary data system.

A monolayer atomic film may be configured to store readable data as binary data values with, for example, the presence of a vacancy in a vacancy region representing a first state and a lack of a vacancy in the vacancy region representing a second state. In other embodiments, various characteristics (e.g., quantity, size, configuration, orientation, etc.) of vacancies, dopants, functional groups, topological features, Stone-Walls defects, and/or other lattice anomalies may be used to represent any of N possible states in an N-based data storage system, where N is any integer greater than 1.

In some embodiments, a platter assembly may include one or more platters each having one or more substantially planar surfaces. A monolayer atomic film, such as graphene, may be positioned on at least one of the substantially planar surfaces. Using graphene as an example, multiple layers of graphene may be positioned on a planar surface. In some embodiments, the uppermost surface may be used to store data. In other embodiments, each layer may be used to store data. In some embodiments, multiple layers may be separated by a spacer.

The platter may comprise carbon, silicon crystal, metal, and/or plastic. For example, the platter may comprise a plastic ribbon, a plastic disk, and/or multiple layers of graphene or hexagonal boron nitride. The platter may be in the form of a disk, a tape, or other recognizable storage media, although any shape and/or size may be implemented in conjunction with the various embodiments provided herein.

In some embodiments, a portion of the monolayer atomic film may be positioned off of the platter assembly. For instance a platter may include one or more holes or may be only a framework for depositing/positioning the monolayer atomic film. In such embodiments, the monolayer atomic film may span gaps or holes in the platter and/or overhang edges of the platter.

The monolayer atomic film may be deposited on the planar surface as a single continuous film. In other embodiments, the monolayer atomic film may be deposited as a plurality of discontinuous or continuous patches of a monolayer atomic film. The discontinuous patches may be physically joined along a grain boundary or an irregular lattice boundary.

The plurality of patches may be physically separated by a gap or overlap one another. In various embodiments, the patches may be less than a square micron, may be between one square micron and 100 square millimeters, or may be greater than 100 square millimeters. The patches may be mapped to facilitate reading the data stored on the monolayer graphene film. For example, each of the plurality of patches may be mapped based on their location on the platter assembly, their location relative to another patch, an orientation, and/or a thickness.

In some embodiments, a vacancy region in the lattice structure of the atomic film may represent one or more possible states, such as for example a 0 or a 1 in a binary data storage system. In some embodiments, one or more dopants may be positioned in the lattice structure to represent one or more possible states. Similarly, a functional group on the lattice structure of the monolayer atomic film may be used to represent one or more possible states. In some embodiments, the monolayer atomic film may be fully functionalized and the removal of one or more functional groups may be used to represent one or more possible states.

In some embodiments, one or more lattice defects may be used to represent one or more possible states. Examples of lattice defects in a hexagonal lattice structure of graphene include a carbon ring with more than six carbon atoms, a carbon ring with fewer than six carbon atoms, a 5-7-7-5 cluster of carbon atoms, and a 5-8-5 cluster of carbon atoms.

A description of these and other defects in graphene and other two dimensional materials is presented in Humberto Terrones et al., *The role of defects and doping in 2D graphene* sheets and 1D nanoribbons, Reports on Progress in Physics 062501 (2012), which is hereby incorporated by reference in its entirety, and Florian Banhart et al., *Structural Defects in Graphene*, ACS Nano 5, 26 (2011), which is also hereby incorporated by reference in its entirety.

A read module may be configured to detect one or more of a vacancy region in a lattice structure, a dopant in a lattice structure, a topological feature, a defect, and/or the presence of a functionalized group on the monolayer atomic film. As described above, one or more vacancies, dopants, topological features, defects, and/or functionalized groups (presence or lack thereof) may be used to represent one of at least two possible states allowing the monolayer atomic film to store readable data in the at least two possible states.

Thus, by detecting a vacancy, a dopant, a topological feature, a defect, or a functionalized group, the read module may read the readable data on the planar surface of the platter by detecting the at least two states. A movement assembly may be configured to rotate at least one of the read module and the platter assembly with respect to the other. In other embodiments, the platter assembly may be a tape configured to move relative to the read module.

The read module may also include an actuator assembly configured to pivot the read module within a parallel plane substantially planar to at least a portion of the planar surface of the platter. The graphene film may comprise an array of readable regions (e.g., vacancy regions) each of which defines 2 or more possible states. The regions may be arranged in a pre-defined geometrical array (e.g., a grid pattern) or may be irregularly located (e.g., with locations stored in a data file). Each region may contain (or not contain) a single defect, vacancy, dopant, topographical feature, or functional group. Alternatively, each region may contain multiple defects, vacancies, dopants, topological features, or functional groups, characterized by their number and locations (relative to each other or to the edges or center of the region), as well as their type.

In various embodiments, a write module may be configured to write at least one of the states in an N state data storage system. For example, a write module may be configured to add and/or remove dopants, vacancies, topological features, lattice defects, and/or functional groups. A movement assembly may be adapted to move the write module and the platter assembly relative to one another. The write module can create defects and associated topological features by local irradiation (ion, electron, plasmon) to remove carbon or pre-existing dopants from the lattice. Dopants can be added directly via a bombarding ion or indirectly via interaction of a dopant source with a (pre-existing or newly created) vacancy or locally heated region.

Electron-based defect creation is described in Alex W. Robertson et al., *Spatial control of defect creation in graphene at the nanoscale*, Nature Comm. 3:1144 (2012), which is hereby incorporated by reference in its entirety. Ion-based defect creation is described in Jian-Hao Chen et al., *Defect scattering in graphene*, Physical Rev. Letters 236805 (2009), which is hereby incorporated by reference in its entirety. Laser defect creation (which can be further confined via its plasmonic analog) is described in Thilanka Galwaduge et al., *Laser Induced Structural Modification of Single Layer and Bilayer Graphene*, American Physical Society March Meeting 2010, abstract #P22.00008 (Mar. 17, 2010), available at http://www.physics.drexel.edu/~lowtemp/graphene_laser_induced_defects.pdf, which is hereby incorporated by reference in its entirety.

Functional groups can be added or removed by, for example, techniques described in Vasilios Georgakilas et al., *Functionalization of Graphene: Covalent and Non-Covalent Approaches, Derivatives and Applications*, Chemical Reviews 112, 6156 (2012); and Tapas Kuila et al., *Chemical Functionalization of Graphene and its Applications, Progress* in Materials Science 57, 1061-1105 (2012), each of which is hereby incorporated by reference in its entirety. Sequential approaches may also be useful, such as defect creation by rapid removal of functional groups as described in Rahul Mukherjee et al., *Photothermally Reduced Graphene as High-Power Anodes for Lithium-Ion Batteries*, ACS Nano 6, 7867 (2012), hereby incorporated by reference in its entirety.

In some embodiments, the write module may or may not have erase/reset capabilities. Depending on the functionalities and granularity of the write module, various techniques used for solid state memory devices, such as erase blocks larger than individual sectors, may be utilized to allow relatively larger regions of the graphene film to be erased (i.e., remove all vacancies, remove dopants, remove functionalized groups, and/or re-functionalize the entire region). In some embodiments a block of data may be virtually erased by removing its location from a data file listing locations of stored data, or by adding its location to a data file listing unused locations.

In some embodiments, the monolayer atomic film may conform substantially to the topography of the underlying substantially planar surface of the platter. Accordingly, topographical features representing states for data storage may be defined with respect to the conformal topography of the graphene film on the substantially planar surface of the platter. As described above, topographical features, such as hills and valleys, may be used to store readable data.

For instance, a hill or a valley may be used to represent 1s and 0s. Alternatively, in a multi-state data representation system, a valley may represent a 0, the lack of a topographical feature may represent a 1, and a hill may represent a 2. In some embodiments, the width, depth, height, length, orientation, shape, and/or other characteristics of the topographical features may be used to represent any number of states in a multi-state data representation system.

Using topographical features to represent states, the monolayer atomic film may include any number of layers of, for example, graphene, hexagonal boron nitride, and/or silicene. Other atomic films having defined lattice structures may be utilized as well. For example, atomic films having rectangular, pentagonal, hexagonal, heptagonal, octagonal, etc. shape may be utilized and/or adapted for use with one or more of the presently described embodiments. For example, atomic films may use few-layer thick crystals such as molybdenum disulphide, tungsten diselenide, or other metal dichalcogenides rather than monolayers such as graphene, hexagonal boron nitride, or silicine.

In some embodiments, the monolayer atomic film may comprise graphene and the readable data may be stored using N possible states with topographical features representing each of the N possible states based on size, shape, or orientation. In some embodiments the topographical feature may comprise an absence or addition of one or more carbon atoms from a nominal hexagonal lattice position, one or more adjacent non-hexagonal carbon rings, one or more dopants in the lattice structure of the graphene, a functional group, and/or a lattice defect, such as one or more Stone-Walls defects.

For example, the topographical feature may be defined by a single dopant in the graphene film or a doped region of the graphene film. Similarly, a single vacancy, lattice defect, and/or functional group in the lattice structure may represent a state or a region of multiple vacancies, lattice defects, and/or functional groups. In some embodiments the graphene film may be functionalized graphene. In such embodiments, the removal or replacement of a functional group from the functionalized graphene may be used to represent a state in an N state data representation system.

As provided above, data may be stored in an N state data representation system using dopants, topological features, functional groups, defects, vacancies, and/or other differentiable characteristics. In some embodiments, a state may be represented using a single dopant, single topological feature, single functional group, single defect, single vacancy, and/or single other differentiable characteristic. In other embodiments, a state may be represented using a doped region, region of functional groups, region of defects, region of topological features, region of multiple vacancies, and/or region of other differentiable characteristics. In some embodiments, a read module may directly detect a single (or region of) dopant, functional group, defect, vacancy, and/or other differentiable characteristic to read the readable data. In other embodiments, a read module may read a topographical anomaly, such as a hill/protrusion or valley/depression, caused by a single (or region of) dopant, functional group, defect, vacancy, and/or other differentiable.

Functional groups may comprise organic compounds, nanoparticles, and/or linker molecules. A state, for example, may be defined by a plurality of proximate functional groups, a type of the functional groups, a spatial pattern of functional groups, the replacement of a functional group with another type of functional group, and/or a predefined mixture of different functional groups. In some embodiments, a tracking module may track the movement of a functional group or vacancy from a first physical location in the lattice structure to a second physical location in the lattice structure.

Throughout this disclosure the terms "in" and "on" are used interchangeably in many instances. Thus, unless infeasible or nonsensical, the terms "in" and "on" should each be understood as "in and/or on." For example, "a defect in a lattice structure" may include both a "dopant in a lattice structure" and a "dopant on a lattice structure."

Many existing computing devices and infrastructures may be used in combination with the presently described atomic film data storage concepts described herein. Some of the infrastructure that can be used with embodiments disclosed herein is already available, such as general-purpose computers, computer programming tools and techniques, digital storage media, and communication links. A computing device may include a processor such as a microprocessor, a microcontroller, logic circuitry, or the like. A processor may include a special purpose processing device such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1A illustrates a substantially planar surface of a platter 100 with a monolayer atomic film having a hexagonal lattice structure. The platter 100 may comprise carbon, silicon crystal, metal, and/or plastic. As illustrated, the platter 100 may be shaped like a disk and may, or may not, have a hole 105 in the center. According to various embodiments, the platter 100 may have multiple layers of monolayer atomic films. In the illustrated embodiment, the monolayer atomic film has a hexagonal lattice structure. In alternative embodiments, the monolayer atomic film may have any n-polygonal lattice structure and may include any number of layers. In some embodiments, each layer may be used to store data. Multiple layers may be separated by spacers. In some embodiments, the underside of the platter 100 may also have a monolayer atomic film configured to store data as well.

FIG. 1B illustrates a close-up view 110 of the hexagonal lattice structure of the monolayer atomic film on the platter 100 of FIG. 1A. As an example, graphene may be positioned (e.g., deposited, placed, or adhered) on the platter 100. The graphene may form hexagonal bonds between the various carbon atoms. As described above, anomalies in the lattice structure may be used to represent one or more states in an N state data representation model.

Figure 2A:
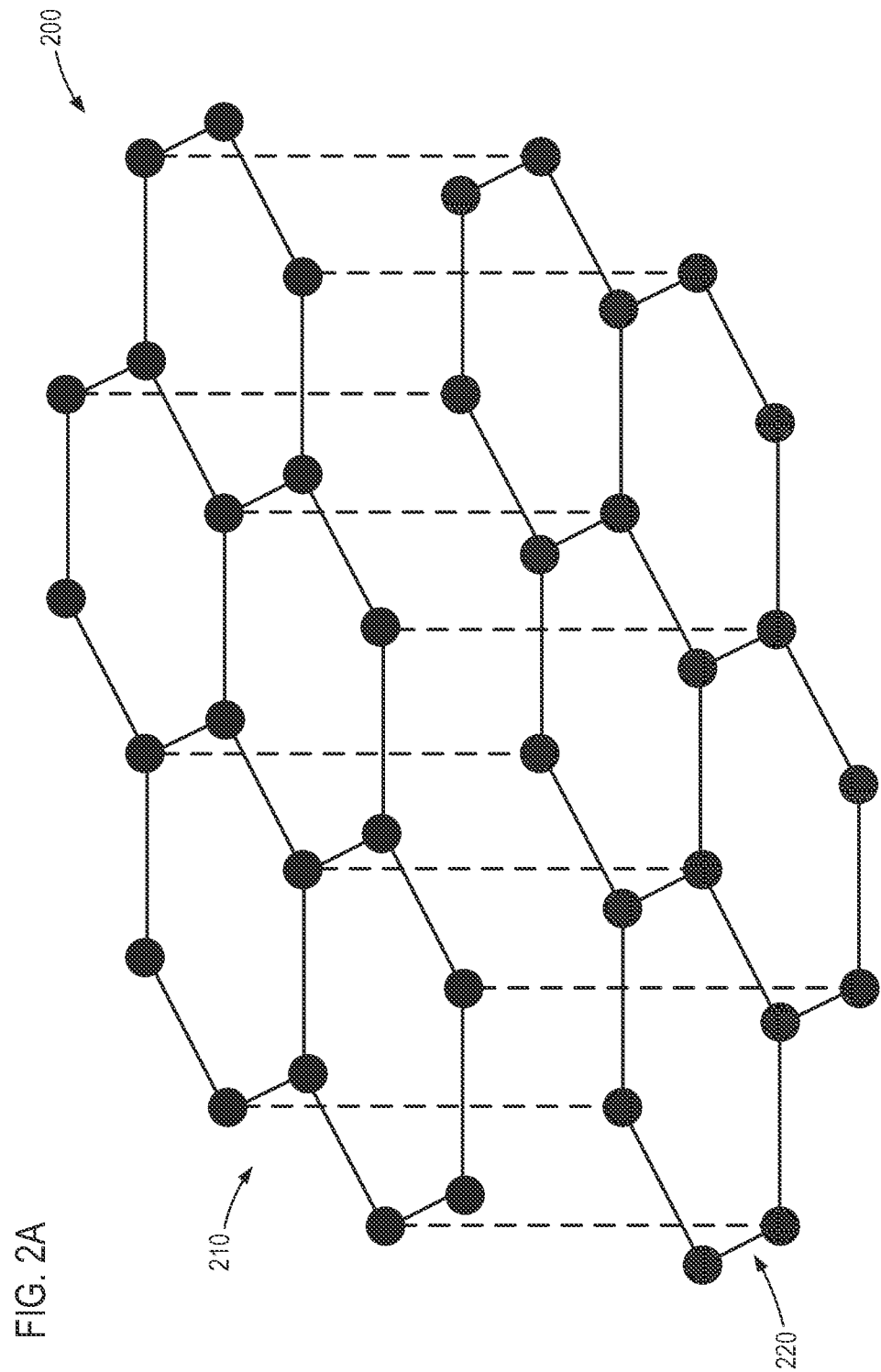
FIG. 2A illustrates a graphene film including two layers of a graphene.

FIG. 2A illustrates a graphene film 200 including two layers of a graphene 210 and 220. As illustrated, each layer of graphene 210 and 220 may be in the form of a hexagonal lattice structure. Each node in the illustration may represent a carbon atom and each solid line may represent a bond. In the illustrated embodiment, the dashed lines illustrate the alignment of the first layer 210 with respect to the second layer 220. Data may be stored in the bottom layer 220 and/or the top layer 210.

Figure 2B:
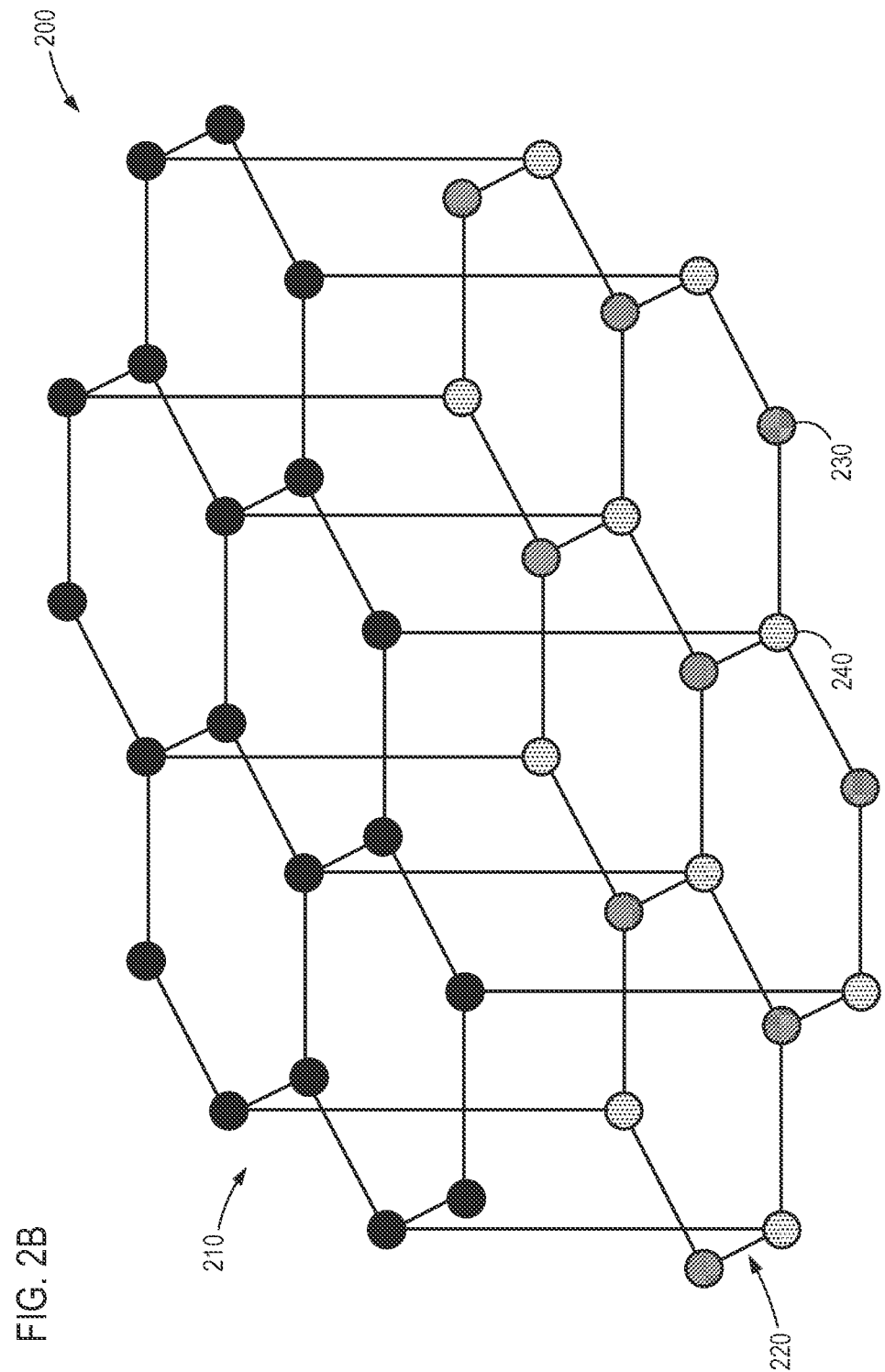
FIG. 2B illustrates an atomic film including two layers offset with respect to one another.

FIG. 2B illustrates an atomic film 200 including two layers 210 and 220 that are offset with respect to one another. As illustrated the bottom layer 220 may include different types of atoms and/or molecules 240 and 230 that form the hexagonal lattice structure. The top layer 210 may be graphene, hexagonal boron nitride, silicene, or some other atomic film. The top layer 210 be bonded, adhered, and/or otherwise permanently or semi-permanently positioned on the bottom layer 220. Any of a wide variety of bonding may be utilized. For example, bonding may include Van der Wall bonds, covalent bonds, ionic bonds, and/or the like. Data may be stored in the bottom layer 220 and/or the top layer 210.

FIGS. 3A-3E illustrate various embodiments 310, 320, 330, 340, and 350 of hexagonal monolayer atomic films. In the illustrated embodiments, each of the nodes of a particular shading illustrates a unique type of atom or molecule. For example, nodes shaded black may represent carbon atoms, nodes shaded dark grey may represent nitrogen, and nodes shaded light grey may represent boron. Accordingly, FIGS. 3A-3E show that various configurations and varieties of lattice structures are possible in conjunction with the various embodiments described herein. The illustrated embodiments show hexagonal lattice structures. However, the systems and methods of using anomalies in lattice structures to represent data, as described herein, may be adapted for use on any lattice structure having a normal N-polygonal configuration, where N is an integer greater than 2.

Figure 4A:
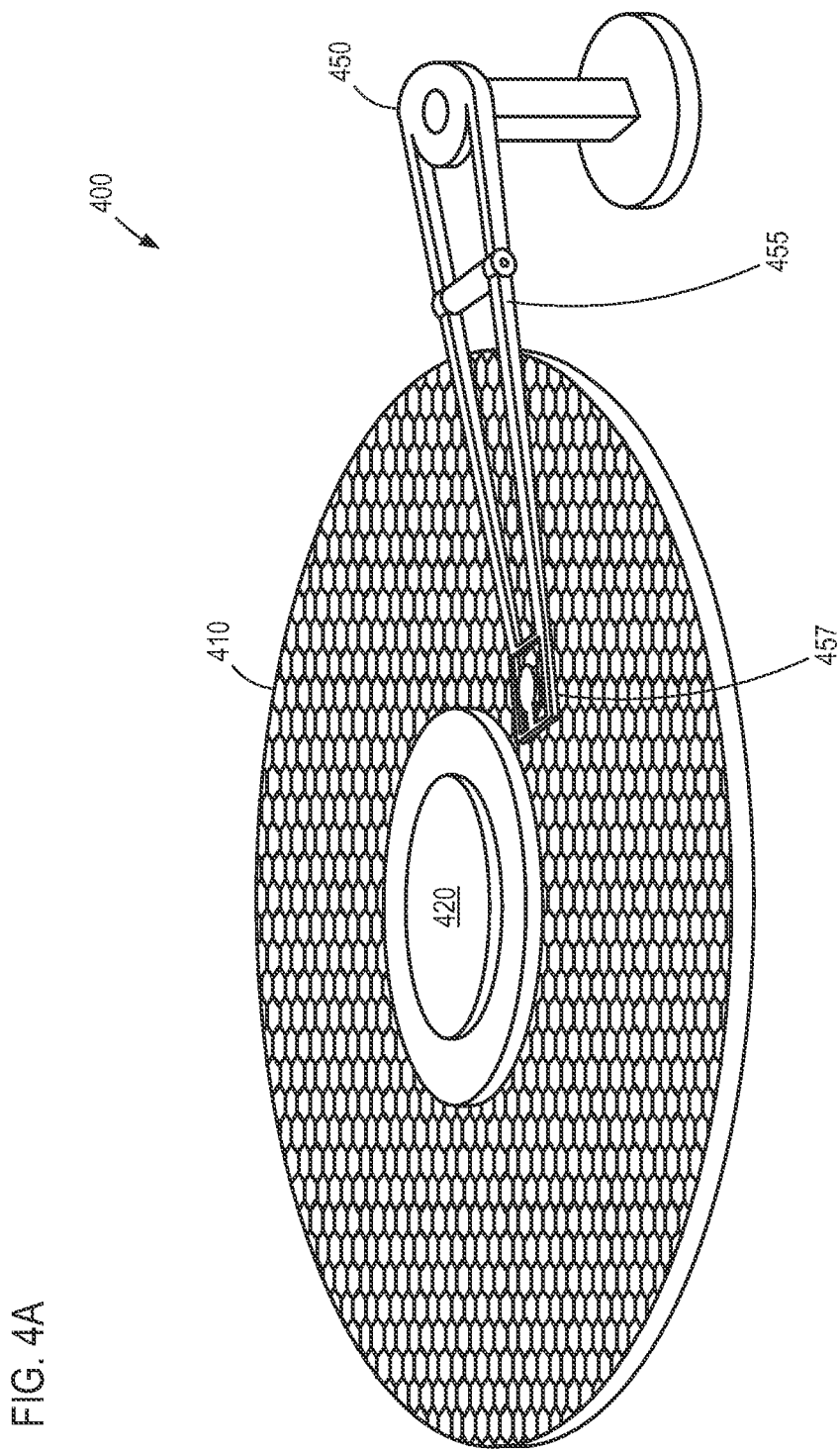
FIG. 4A illustrates a read assembly configured to read data encoded on an atomic film using one or more of vacancies, dopants, and functional groups.

FIG. 4A illustrates a read assembly 400 configured to read data encoded on an atomic film 410 on a platter 420. The read assembly may include a read head 457, an arm 455, and an actuator 450. The actuator 450 may be configured to pivot the arm 455 and the read head 457 with respect to the platter 420. The platter 420 may be configured to rotate. The rotation of the platter 420 in conjunction with the pivoting actuator 450 may allow all areas of the atomic film 410 to be accessed by the read head 457. The read head 457 may be configured to detect anomalies in the lattice structure of the atomic film 410. For example, the read head 457 may be configured to detect vacancies, dopants, functional groups, lattice defects, the lack of functional groups, and/or other anomalies.

In some embodiments, the read head 457 may be configured to detect topographical features, such as hills or valleys, that may be caused by anomalies in the lattice structure. In one embodiment, the read assembly 400 may comprise elements of an atomic force microscope, such as the actuator 450, the arm 455, or the read head 457. In some embodiments, the read head 457 may detect defects in the lattice structure via physical contact, or via changes in the atomic film's electronic, plasmonic, optical, or vibrational properties.

Electronic signatures of various graphene defects are described in I. Deretzis, *Electronic transport signatures of common defects in irradiated graphene-based systems*, Nuclear Instruments & Methods in Physics Res. B 282, 108 (2012), hereby incorporated by reference in its entirety. Electronic and vibrational signatures of Stone-Wales defects are described in Sharmila N. Shirodkar & Umesh V. Waghmare, *Electronic and vibrational signatures of Stone-Wales defects in graphene: First-principles analysis*, Physical Rev. B 165401 (2012), hereby incorporated by reference in its entirety. High resolution Raman detection of defects is described in Johannes Stadler et al., *Nanoscale Chemical Imaging of Single-Layer Graphene*, ACS Nano 5, 8442 (2011), hereby incorporated by reference.

Small-tip electron microscopy methods such as annular dark-field imaging may be used to provide single-atom level detection and characterization of graphene defects, such as the methods described in Wu Zhou et al., *Probing graphene defect structures and optical properties at the single atom level*, 15th European Microscopy Congress (Sep. 17, 2012), available at http://www.emc2012.org.uk//documents/Abstracts/Abstracts/EMC2012_0370.pdf, hereby incorporated by reference in its entirety.

Topological defects can be detected and characterized either directly via their topological height differences from the underlying monolayer or indirectly via their effect on electronic properties, as described in Alberto Cortijo & Maria A. H. Vozmediano, *Effects of topological defects and local curvature on the electronic properties of planar graphene*, Nuclear Physics B 763, 293 (2007), hereby incorporated by reference in its entirety, and in Jannik C. Meyer et al., *Direct Imaging of Lattice Atoms and Topological Defects in Graphene Membranes*, Nano Letters 8, 3582 (2008), hereby incorporated by reference in its entirety. The detection and characterization of functional groups can be performed directly via chemical probes, near-field spectroscopy or the like, or indirectly via their effect on the electronic or optical properties of the graphene.

Figure 4B:
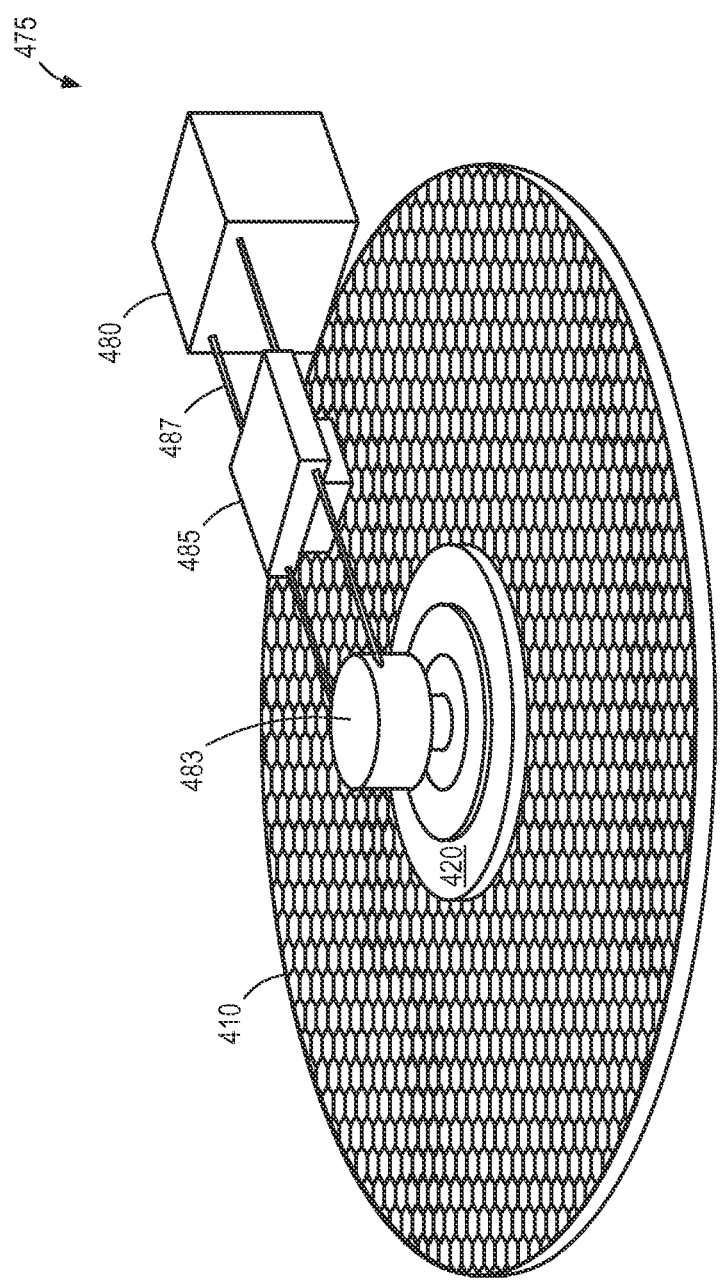
FIG. 4B illustrates an alternative embodiment of a read assembly and a platter with an atomic film thereon.

FIG. 4B illustrates an alternative embodiment of a read assembly 475 and a platter 420 with an atomic film 410 thereon. As illustrated and previously described, the atomic film 410 may be a monolayer atomic film with a hexagonal lattice structure, such as graphene or boron nitride. Data may be stored as anomalies in the lattice structure that represent one or more states in an N state data representation system. For example, different types of anomalies and/or the lack of an anomaly may represent a state in a binary or ternary data representation system.

The read module 475 may include a read head 485 that slides along rails 487 between a center post 483 and an outside post 480. The platter 420 may rotate about the axis defined by the center post 483 to allow the read head 485 to access each portion of the atomic film 410. The platter 420 and/or the read assembly 475 may be configured to rotate with respect to the other. The read head 485 may be configured to detect anomalies in the lattice structure of the atomic film 410.

As above, the read head 485 may be configured to detect topographical features, such as hills or valleys, that may be caused by anomalies in the lattice structure and/or directly detect anomalies in the lattice structure. The format, shape, size, etc. of the platter may be different than illustrated. For example, the platter may be in the form of a tape configured to flexibly wind and unwind past a read head.

Figure 5:
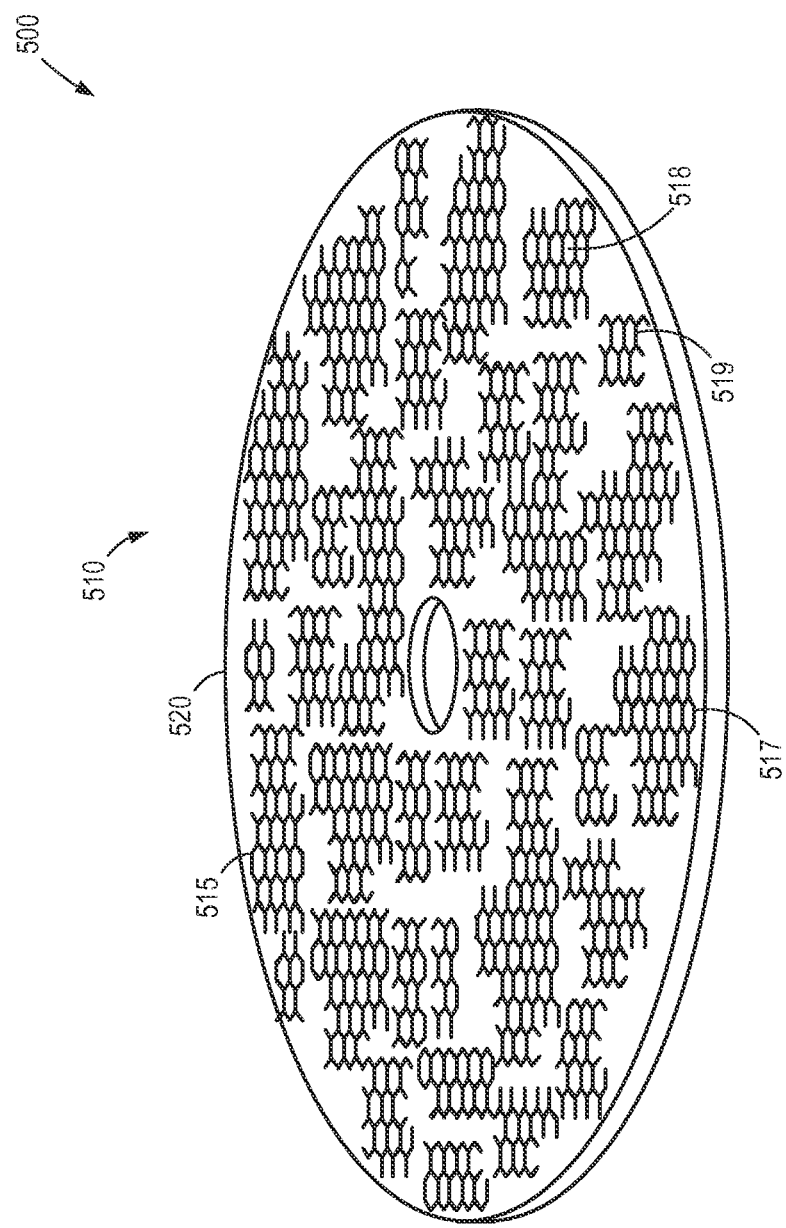
FIG. 5 illustrates a plurality of disjointed patches of a monolayer atomic film on a planar surface of a platter.

FIG. 5 illustrates a plurality of disjointed patches 515, 517, 518, and 519 of a monolayer atomic film 510 on a planar surface of a platter 520 of a data storage medium 500. The monolayer atomic film 510 may be deposited on one or more of the planar surfaces of the platter 520 as a single continuous film. In other embodiments, the monolayer atomic film 510 may be deposited as a plurality of discontinuous or continuous patches 515, 517, 518, and 519 of an atomic film. The discontinuous patches 515, 517, 518, and 519 may be physically joined along a grain boundary or an irregular lattice boundary.

The plurality of patches 515, 517, 518, and 519 may be physically separated by a gap (as illustrated) or overlap one another. In various embodiments, the patches 515, 517, 518, and 519 may be between one square micron and 100 square millimeters. The patches 515, 517, 518, and 519 may be mapped to facilitate reading the data stored on, for example, a graphene film 510. For instance, each of the plurality of patches 515, 517, 518, and 519 may be mapped based on their location on the platter 520, their location relative to another patch, an orientation on the platter 520, and/or a thickness of a film 510.

Figure 6A:
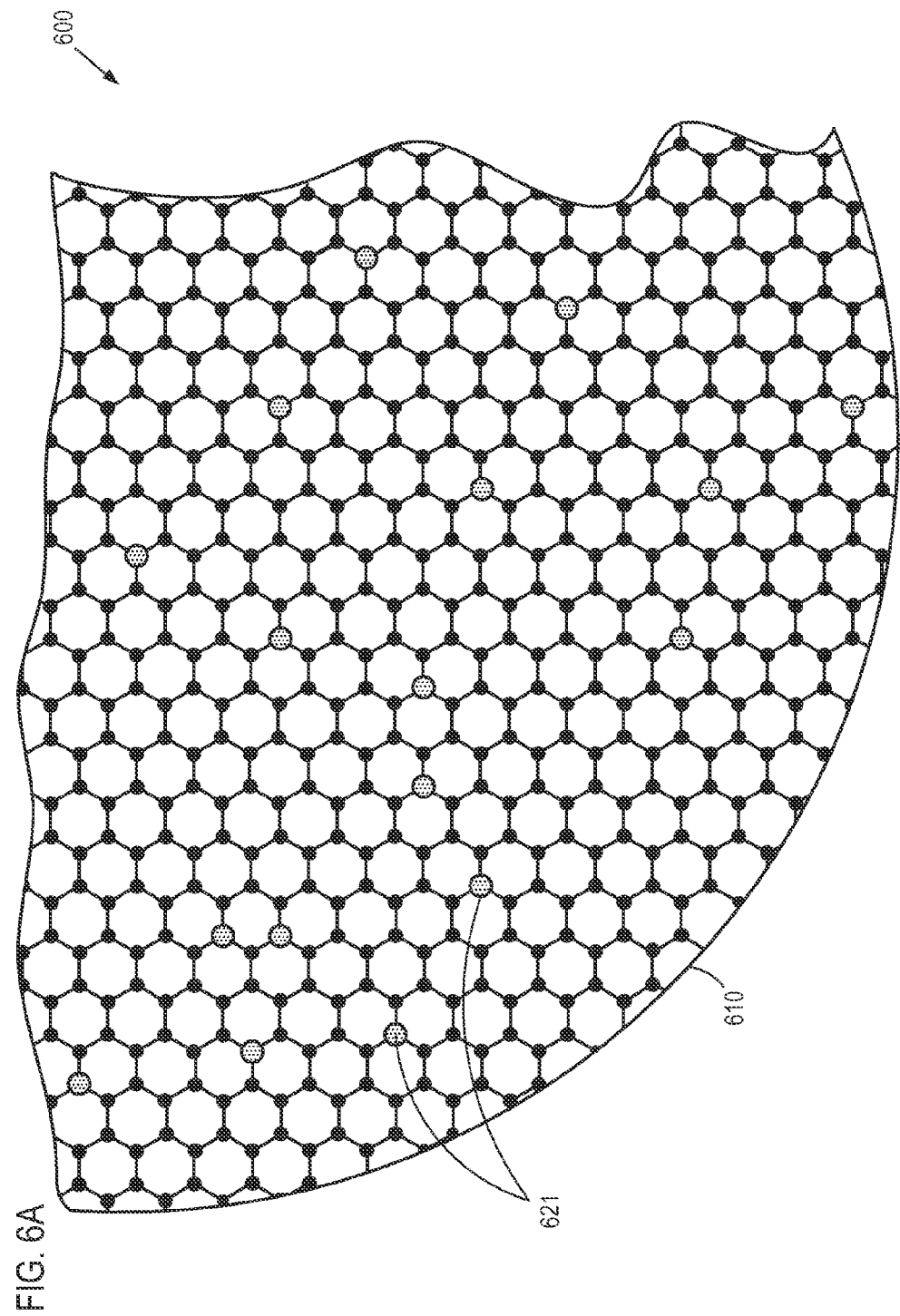
FIG. 6A illustrates a portion of a platter with a monolayer atomic film on the surface with dopants used to represent one or more possible states.

FIG. 6A illustrates a portion of a platter with a monolayer atomic film 610 on the surface with dopants 621 used to represent one or more possible states in a multi-state data representation model. The data storage medium 600 may be any size or shape, such as the illustrated disk or a tape format. In some embodiments, each dopant 620 may represent one of two states in a binary data representation model. In another embodiment, each dopant 621 may represent one of three states in a ternary data representation model. In still other embodiments, each dopant 621 may represent one of N states in an N state data representation model.

As described herein, a read module may be configured to directly detect dopants 621 and a lack of dopants 621 as, for example, 0s and 1s, in a binary data representation model. In other embodiments, a read module may be configured to detect topographical features caused by the dopants as a first state (e.g., a 1 or a 0) and the lack of a topographical feature as a second state (e.g., a 1 or a 0). In other embodiments, a read module may be configured to detect a first type of topographical feature caused by one or more dopants as a first state and a second type of topographical feature as a second state.

Figure 6B:
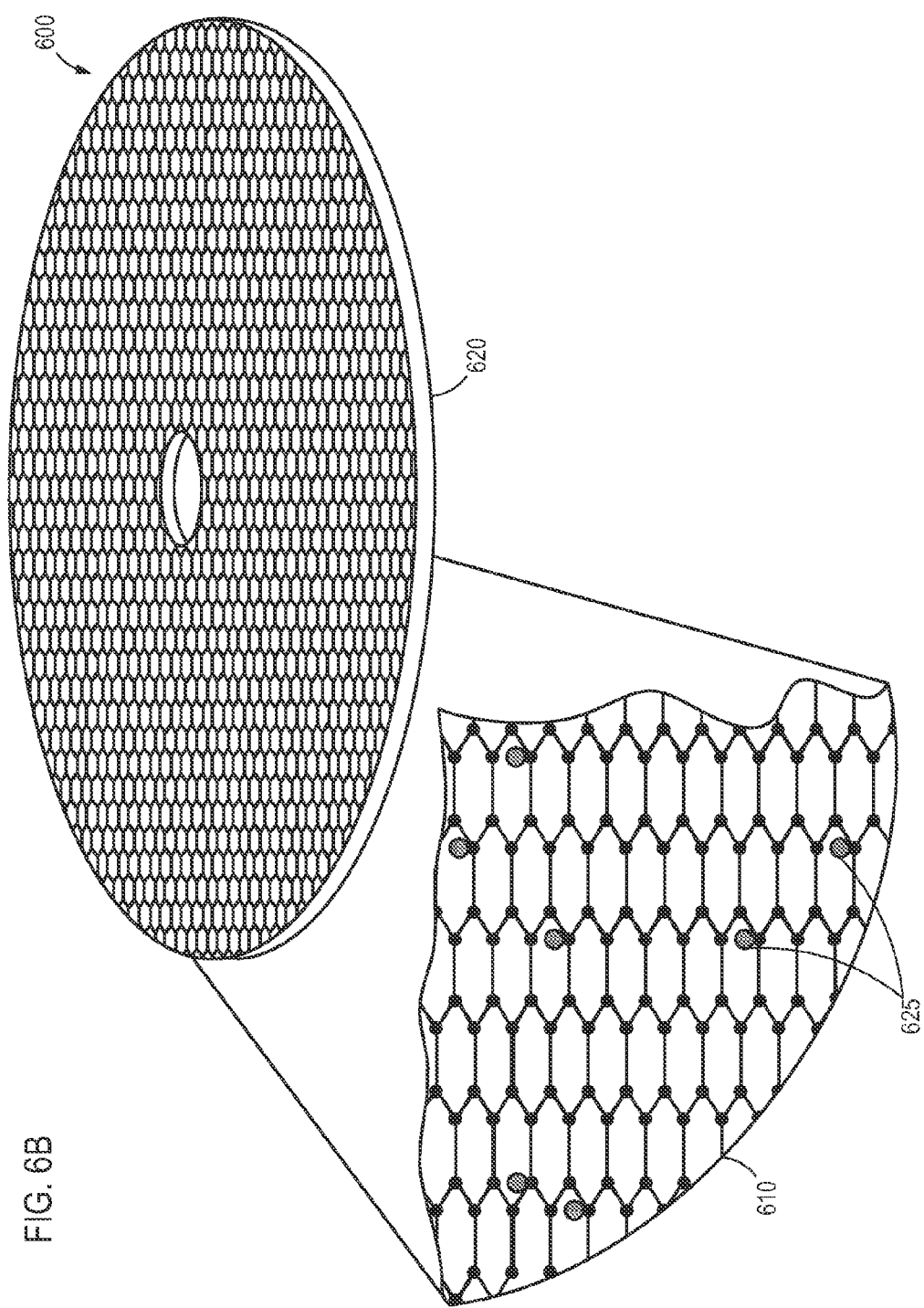
FIG. 6B illustrates a portion of a platter with a monolayer atomic film on the surface with functional groups used to represent one or more possible states.

FIG. 6B illustrates a portion of a platter 620 with a monolayer atomic film 610 on the surface with functional groups 625 used to represent one or more possible states. Similar to the embodiments described above in conjunction with FIG. 6A, functional groups 625 may be used to represent one or more possible states in an N state data representation module. As described herein, a read module may be configured to directly detect functional groups 625 and a lack of functional groups 625 as, for example, 0s and 1s, in a binary data representation model. In other embodiments, a read module may be configured to detect topographical features caused by the functional groups as a first state (e.g., a 1 or a 0) and the lack of a topographical feature as a second state (e.g., a 1 or a 0). In other embodiments, a read module may be configured to detect a first type of topographical feature caused by one or more functional groups as a first state and a second type of topographical feature caused by one or more functional groups as a second state.

Figure 7A:
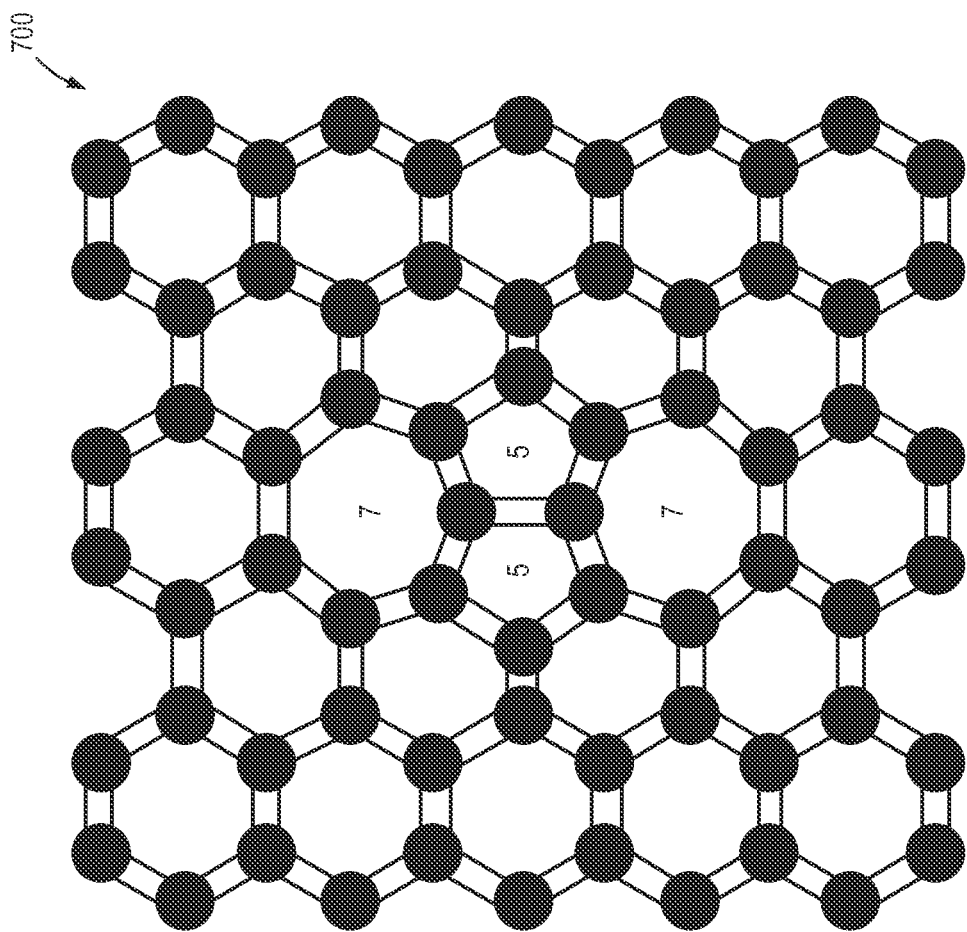
FIG. 7A illustrates an atomic film with a 5-7-7-5 lattice defect used to represent one or more possible states.

FIG. 7A illustrates an atomic film 700 with a 5-7-7-5 lattice defect used to represent one or more possible states. As described herein, data may be stored using an N state data representation model in which one or more states are represented using lattice defects, such as 5-7-7-5 lattice defects. In various embodiments, a read module may be configured to directly detect a lattice defect. In other embodiments, a read module may be configured to detect topographical features caused by the lattice defects, such as hills/protrusions and/or valleys/depressions. In some embodiments, various types of lattice defects, such as 5-7-7-5 lattice defects and 5-8-5 lattice defects, may be used to represent states in a ternary or higher level data representation model.

Figure 7B:
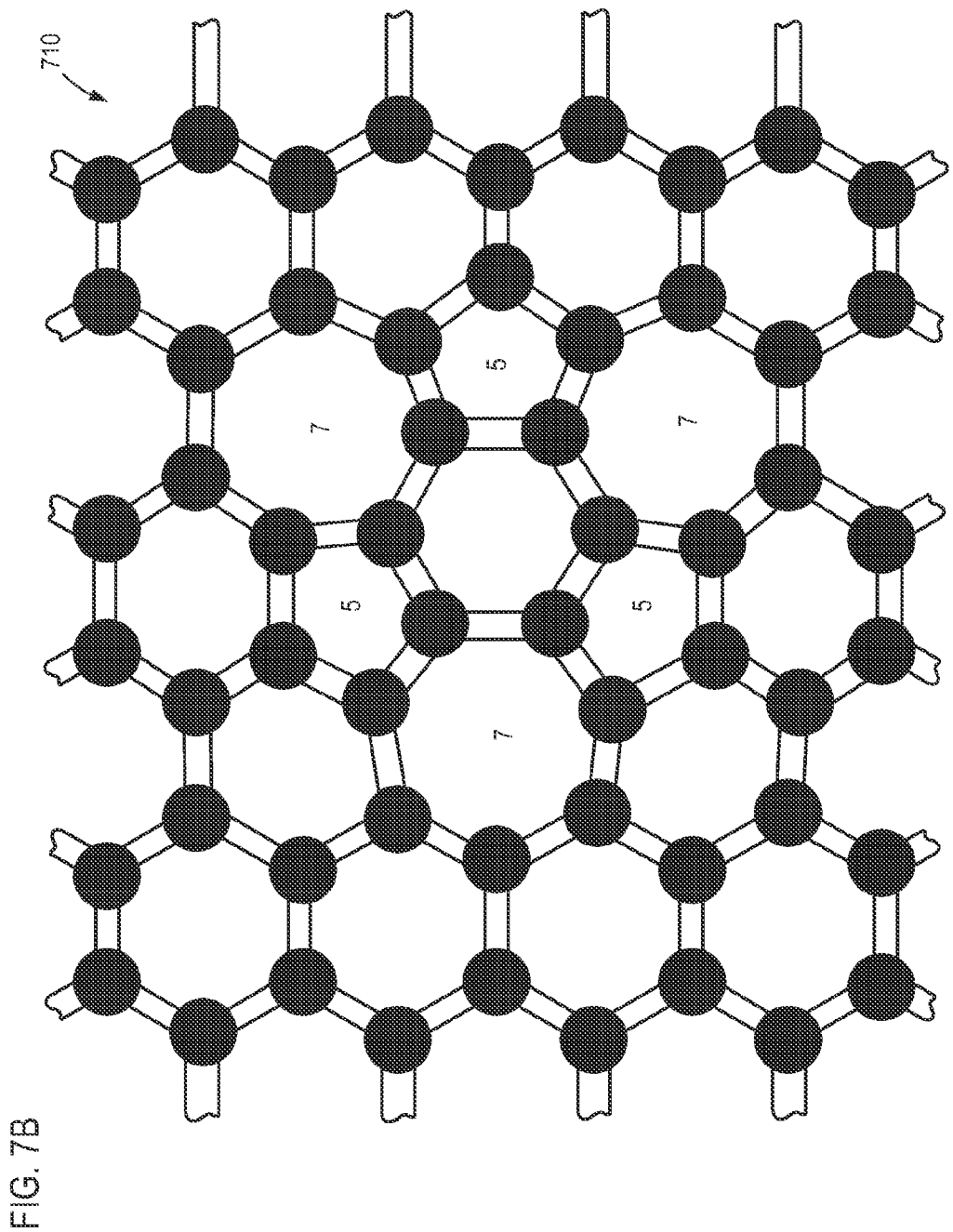
FIG. 7B illustrates another example of a lattice defect used to represent a state in a multi-state data storage.

FIG. 7B illustrates another example of a lattice defect in an atomic film 710 that may be used to represent one or more states in a multi-state data storage model. As described above, any of a wide variety of lattice defects, in hexagonal lattice structures or other N-polygonal lattice structures, may be used to directly represent one or more states in a base N (e.g., binary, ternary, etc.) data representation model. In some embodiments, any of a wide variety of lattice defects, including the illustrated lattice defect, may be used to create distinguishable topographical features for storing data.

FIG. 7C illustrates a topographical feature (a protrusion) 750 used to represent one or more possible states in a monolayer atomic film 710, such as graphene or hexagonal boron nitride. In the illustrated embodiment, a lattice defect 715, such as a 5-7-7-5 lattice defect, may cause the topographical feature 750.

Figure 8:
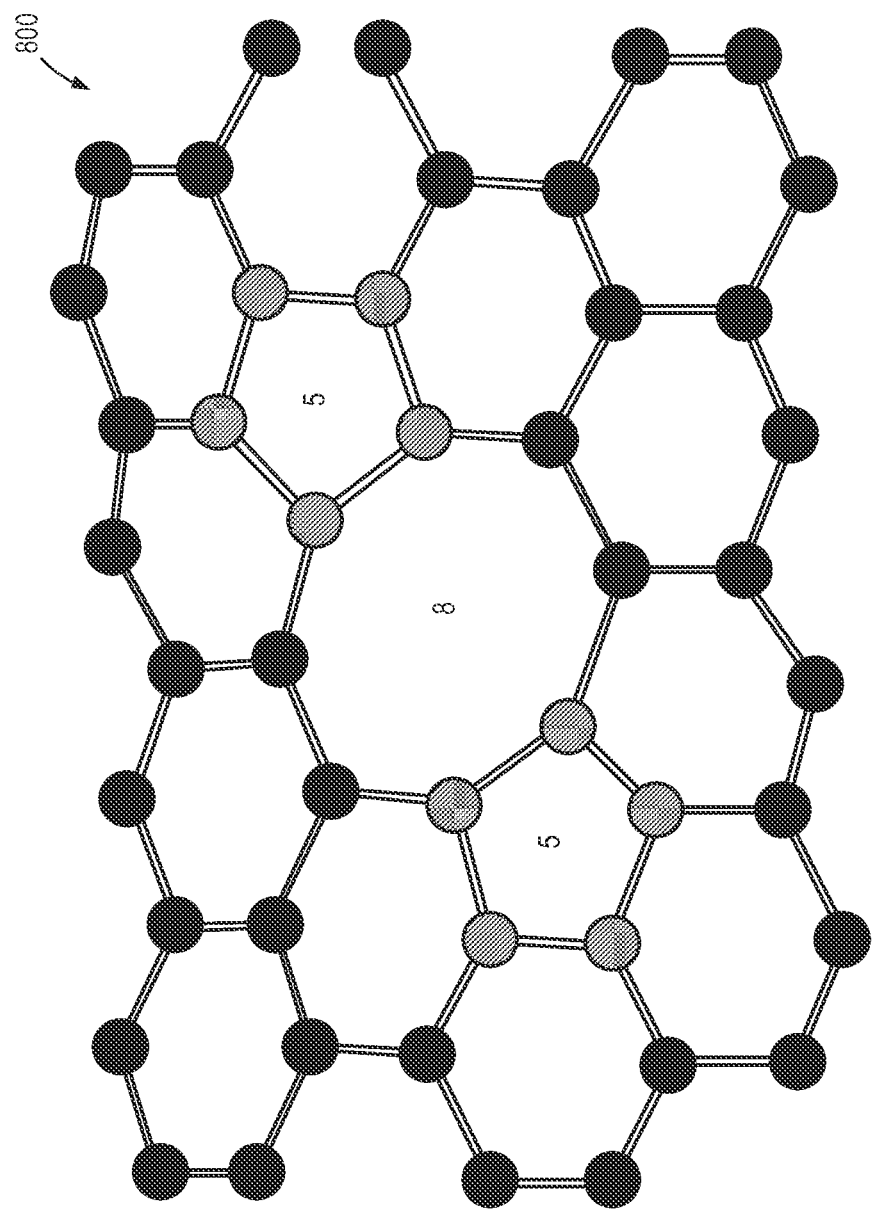
FIG. 8 illustrates a 5-8-5 lattice defect used to represent one or more possible states.

FIG. 8 illustrates another example of a lattice defect in a monolayer atomic film 800. Specifically, FIG. 8 illustrates a 5-8-5 lattice defect in a monolayer atomic film 800. As described above, any of a wide variety of lattice defects, in hexagonal lattice structures or other N-polygonal lattice structures, may be used to directly represent one or more states in a base N (e.g., binary, ternary, etc.) data representation model. In some embodiments, any of a wide variety of lattice defects, including the illustrated lattice defect, may be used to create distinguishable topographical features for storing data.

Figure 9:
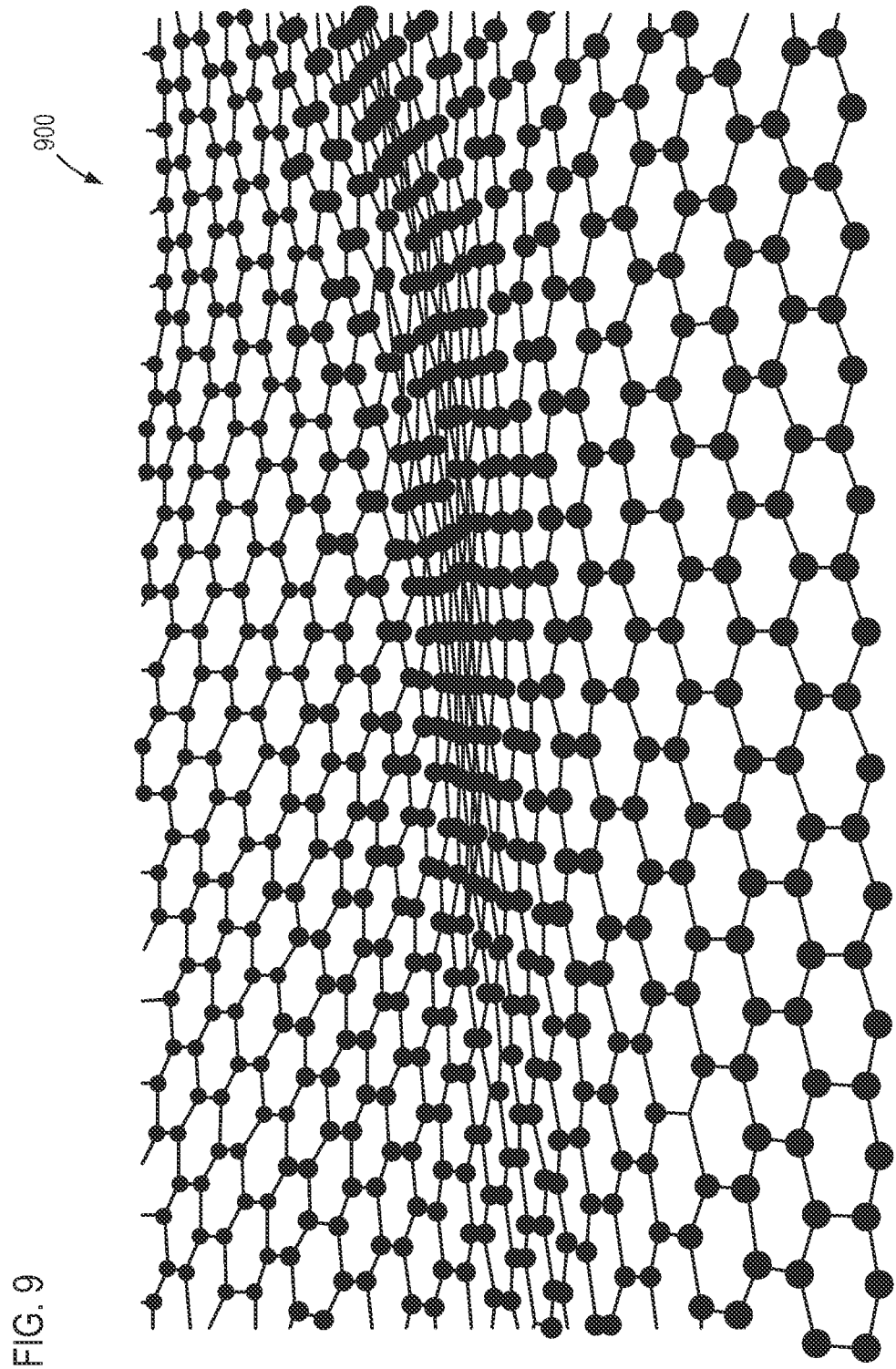
FIG. 9 illustrates a topographical feature caused by defects in the lattice structure or vacancies used to represent one or more possible data states.

FIG. 9 illustrates a region of a graphene lattice 900 with a topographical depression caused by one or more vacancies in the lattice structure and/or dopants in the lattice structure. As described herein, one or more topographical features may be used to represent one or more states in a binary, ternary, or base N data representation model on a normally uniform lattice structure.

In some embodiments, the atomic film may be positioned on a platter. The atomic film may conform substantially to the topography of the underlying substantially planar surface of the platter. Accordingly, topographical features representing states for data storage may be defined with respect to the conformal topography of the graphene film on the substantially planar surface of the platter. Accordingly, the conformal topography of the graphene film on the platter (i.e., without data) may be mapped to enable a detection of topographical feature defined with respect to the conformal topography of the graphene film on the platter. As described above, topographical features, such as hills and valleys, may be used to store readable data.

Figure 10A:
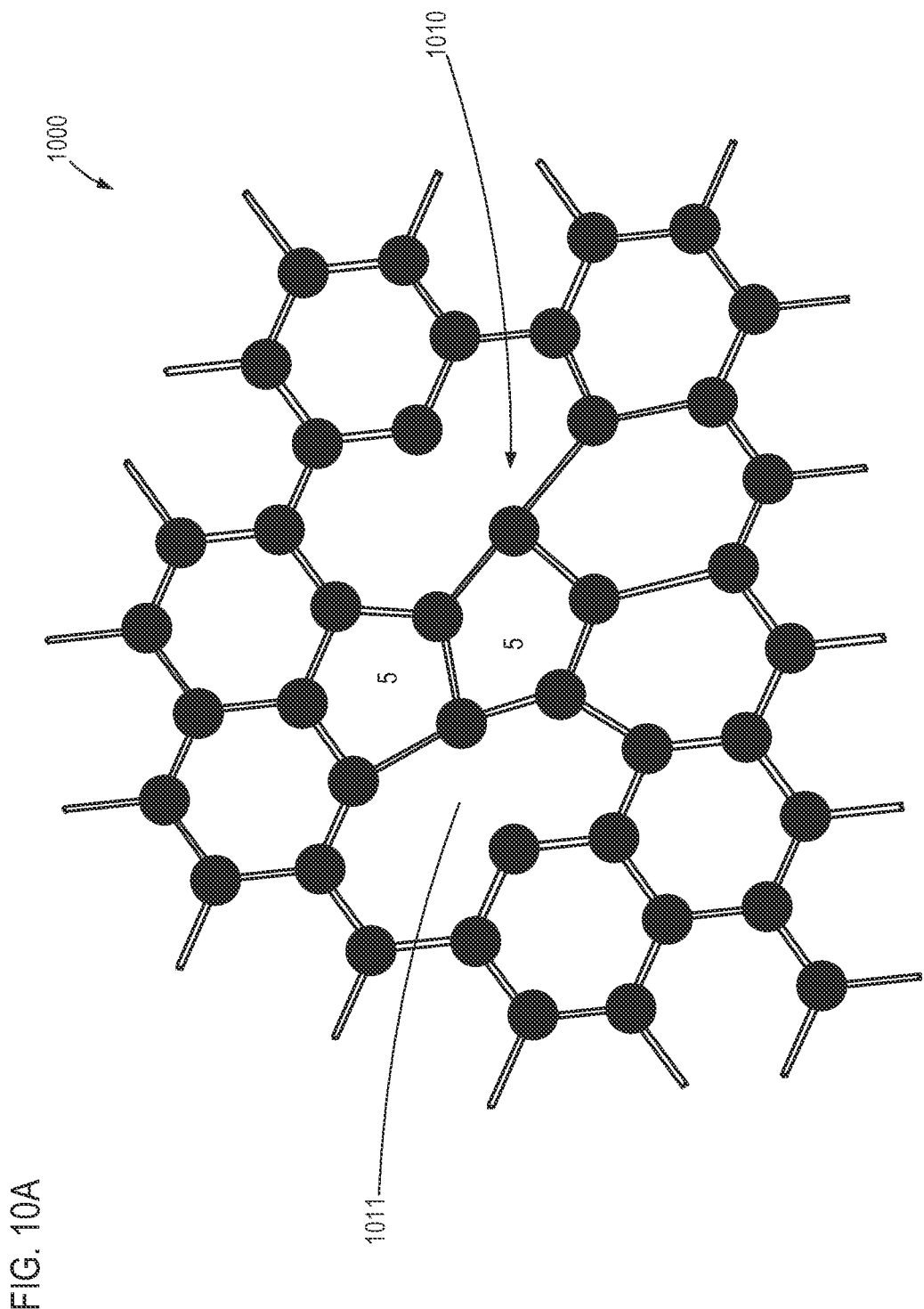
FIG. 10A illustrates vacancies in a lattice structure used to represent one or more possible data states.

FIG. 10A illustrates vacancies 1010 and 1011 in a lattice structure 1000 that may be used to represent one or more possible data states. As described above, vacancies and/or lattice defects may be used to directly or indirectly (via topographical features) represent one or more states in a base N (e.g., binary, ternary, etc.) data representation model.

Figure 10B:
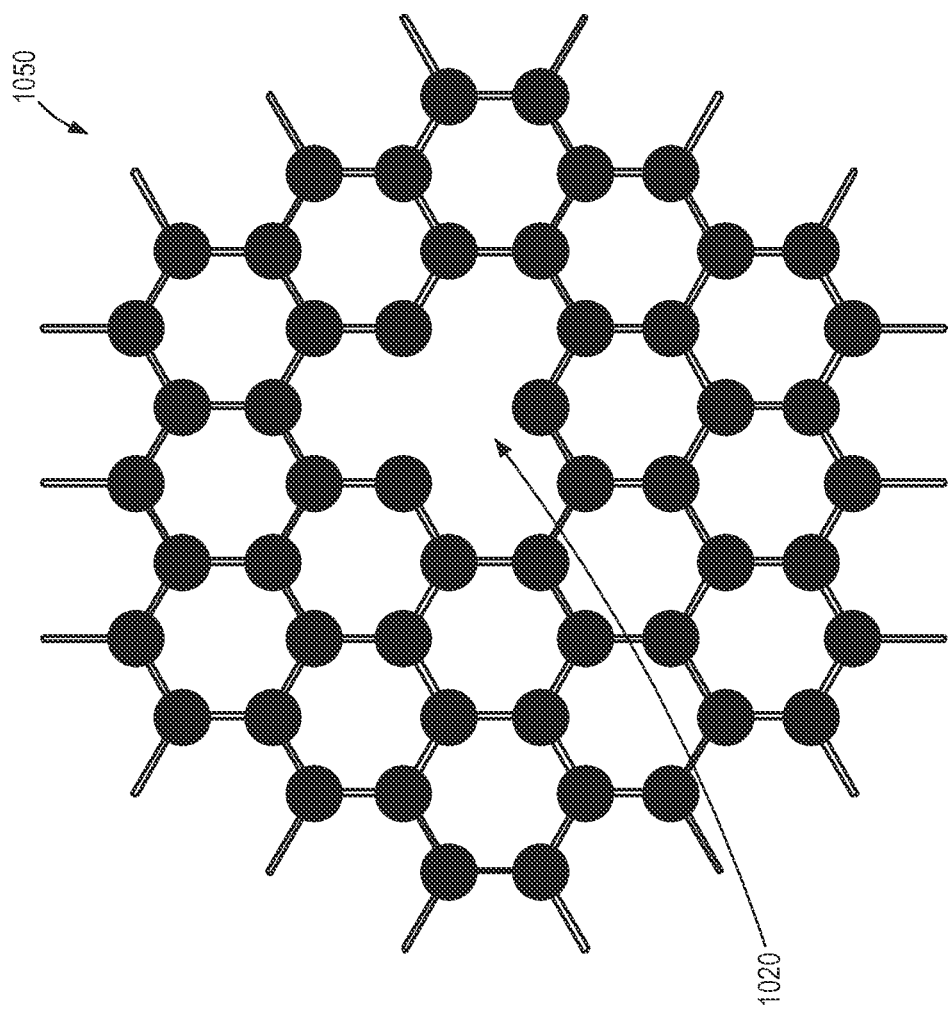
FIG. 10B illustrates another example of a vacancy in a lattice structure used to represent one or more possible data states.

FIG. 10B illustrates another example of a vacancy 1020 in a lattice structure 1050 that may be used alone or in conjunction with other vacancies to represent one or more possible states in a data representation model. In some embodiments, multiple vacancies (or functional groups, dopants, etc.) may be used to represent a single bit or singular data unit in a data representation model.

Figure 11:
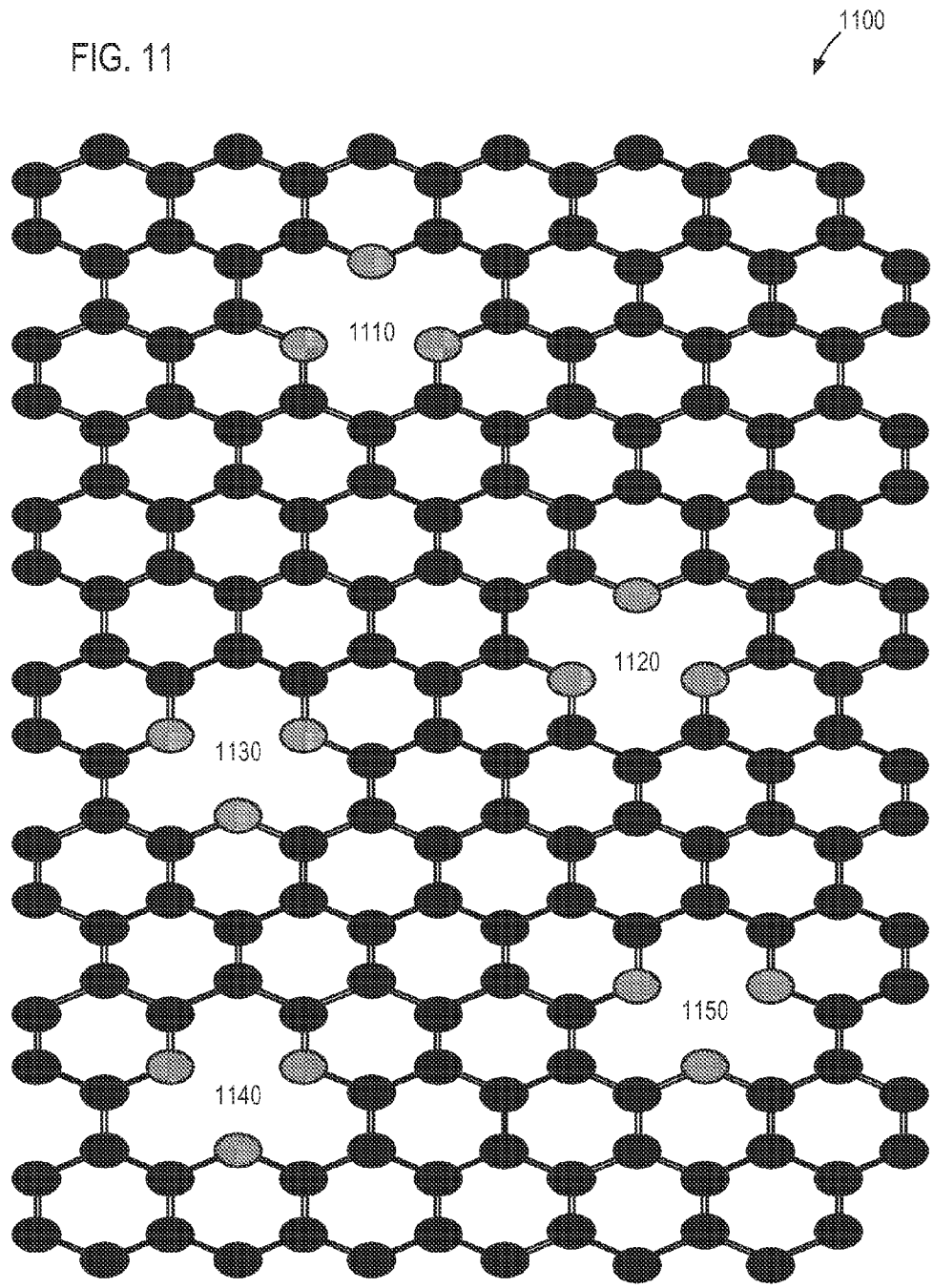
FIG. 11 illustrates vacancies used in a portion of a lattice structure used to represent a sequence of 0s and 1s.

FIG. 11 illustrates a plurality of vacancies 1110, 1120, 1130, 1140, and 1150 in a region of a graphene lattice structure 1100 that may be used to individually represent bits in an N base data representation model or collectively represent bits in an N base data representation model. For example, each vacancy 1110, 1120, 1130, 1140, and 1150 may represent a bit in a binary data representation model. As another example, two vacancy regions 1130 and 1140 within a predetermined region may represent a 1, while a vacancy region 1110 alone may represent a 0. In such an embodiment, various predetermined arrangements/configurations of vacancies (or dopants, topographical features, functional groups, and/or lack of functional groups in a fully functional graphene lattice) may be used to represent bits in any base data representation system.

For example, a first arrangement may represent a 1 in a binary data representation system and a second arrangement may represent a 0 in the binary data representation system. As another example, in a quaternary data representation model, a first arrangement may represent a 0, a second configuration may represent a 1, a third configuration may represent a 2, and a final arrangement may represent a 3.

Figure 12:
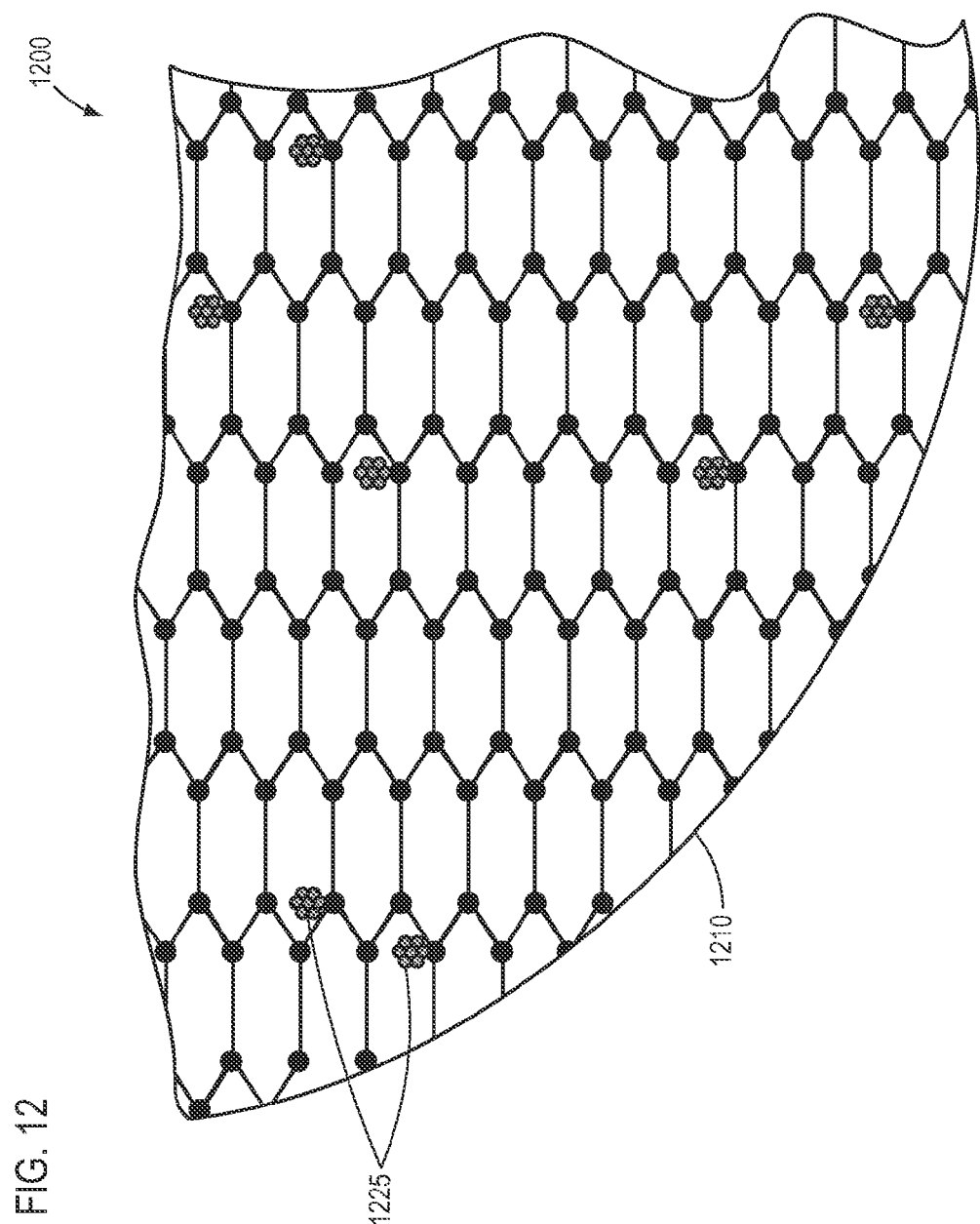
FIG. 12 illustrates a plurality of functional groups used to represent a state in a multi-state data storage device.

FIG. 12 illustrates a plurality of functional groups 1225 on a monolayer atomic film 1210 used to represent a state in a multi-state data storage device 1200. As described above, a singular functional group and/or a collection of functional groups may represent a bit in a multi-state data representation model. In some embodiments, each type of functional group may be used to represent a unique state in a multi-state data representation model. In some embodiments, arrangements/configurations of functional groups of one or more types may be used to represent unique states in a multi-state data representation model. For instance, unique types and/or arrangements/configurations of functional groups (or vacancies, dopants, or topographical features) may be used to represent 0s and 1s in a binary data representation system.

Figure 13A:
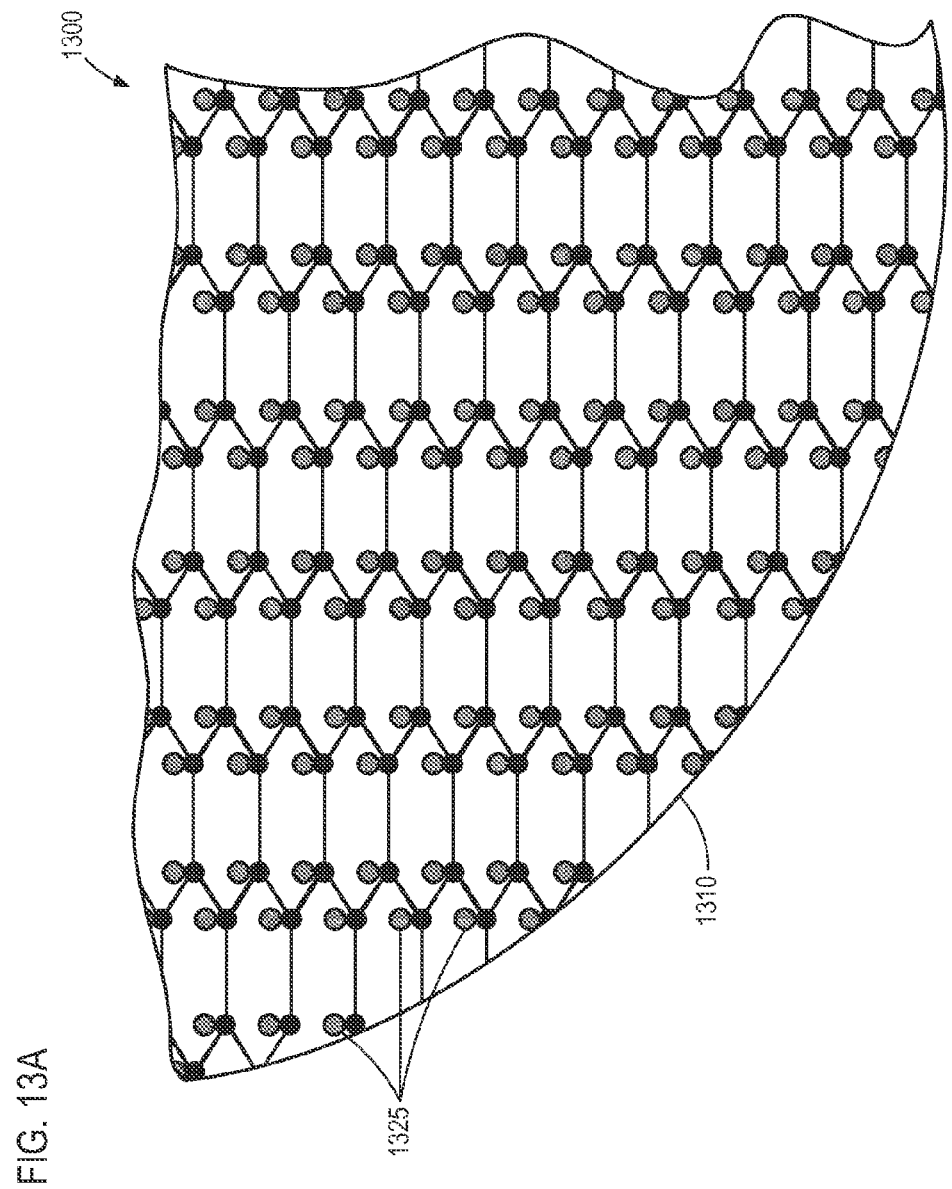
FIG. 13A illustrates a fully functionalized graphene film.

FIG. 13A illustrates a fully functionalized graphene film 1310 on a platter 1300. As illustrated, functional groups 1325 may fully functionalized the graphene film 1310.

Figure 13B:
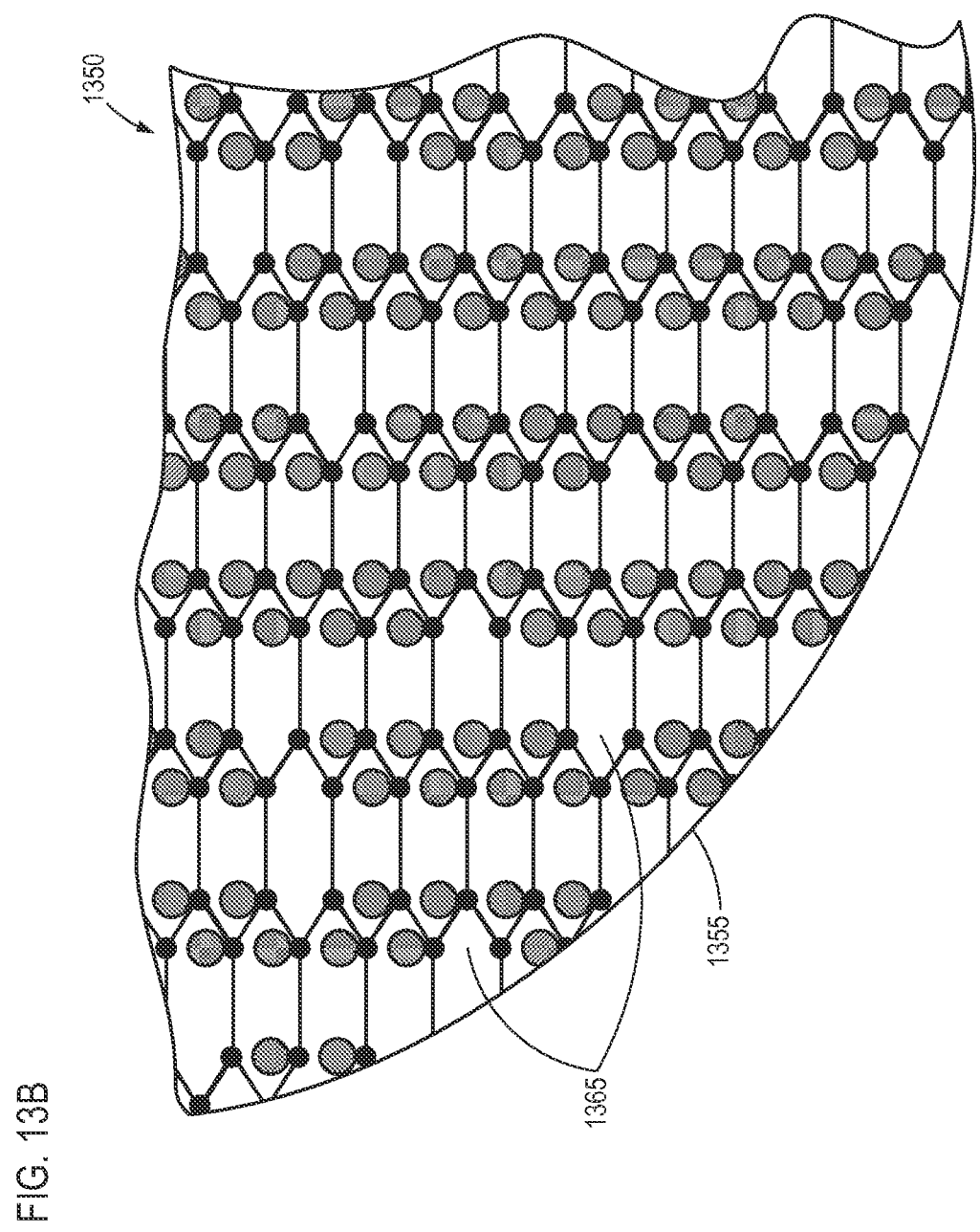
FIG. 13B illustrates an alternative embodiment of a fully functionalized graphene film.

FIG. 13B illustrates an alternative embodiment of a fully functionalized graphene film 1355 on a platter 1350. Functional groups 1365 may be removed from the fully functionalized graphene film 1355. The removed functional groups may be used to represent one or more possible states in a data representation model.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined by the following claims.

What is claimed is:

1. A data storage device, comprising:
a platter assembly comprising at least one platter that has at least one substantially planar surface;
a monolayer graphene film positioned on at least a portion of a substantially planar surface of a platter of the platter assembly, wherein the monolayer graphene film comprises a lattice structure;
a plurality of vacancy regions formed in the lattice structure of the monolayer graphene film,
wherein each vacancy region comprises at least one atom missing from the lattice structure of the monolayer graphene film,
wherein each vacancy region comprises one or more vacancies in the lattice structure of the monolayer graphene film,
wherein each vacancy region comprises one or more sets of adjacent non-hexagonal rings forming one of a protrusion in the lattice structure and a depression in the lattice structure,
wherein each protrusion is configured to represent a first of at least two possible states and each depression is configured to represent a second of the at least two possible states, and
wherein the monolayer graphene film is configured to store readable data in the at least two possible states;
at least one read module configured to read the readable data on the substantially planar surface of the platter by detecting each of the at least two states; and
a movement assembly configured to move at least one of the at least one read module and the platter assembly with respect to the other.

2. The data storage device of claim 1, further comprising:
at least one write module configured to write the readable data on the substantially planar surface of the platter by selectively creating vacancy regions in the lattice structure of the graphene;
a movement assembly configured to move at least one of the at least one write module and the platter assembly with respect to the other.

3. The data storage device of claim 1, wherein the graphene film comprises a plurality of discontinuous patches of graphene, wherein each patch of graphene has a substantially unbroken hexagonal lattice structure that is not continuous with an adjacent patch of graphene.

4. The data storage device of claim 3, wherein each of the plurality of discontinuous patches of graphene is configured to be mapped to facilitate reading the readable data stored on the graphene film.

5. The data storage device of claim 1, wherein the graphene film is configured to store the readable data as base N data values with the vacancy regions representing one of N possible states, wherein N is an integer greater than 1.

6. The data storage device of claim 1, wherein at least one of the plurality of vacancy regions is characterized by at least one dopant replacing at least one carbon atom in the lattice structure of the graphene film.

7. A method of storing data, comprising:
receiving a monolayer graphene film positioned on at least a portion of a substantially planar surface of a platter of a platter assembly, wherein the platter assembly comprises at least one platter that has at least one substantially planar surface, wherein the monolayer graphene film comprises a lattice structure;
receiving a plurality of bits of digital data; and
creating a plurality of vacancy regions in the lattice structure of the monolayer graphene film, wherein each vacancy region comprises at least one atom missing from the lattice structure of the graphene film,
wherein each vacancy region comprises one or more vacancies in the lattice structure of the monolayer graphene film,
wherein each vacancy region comprises one or more sets of adjacent non-hexagonal rings forming one of a protrusion in the lattice structure and a depression in the lattice structure,
wherein each protrusion is configured to represent a first of a least two possible states and each depression is configured to represent a second of the at least two possible states, and
wherein at least one bit of the digital data is stored using the at least two possible states.

8. A method of reading data, comprising:
receiving a monolayer graphene film positioned on at least a portion of a substantially planar surface of a platter of a platter assembly, wherein the monolayer graphene film comprises a lattice structure;
reading readable data on the substantially planar surface of the platter by detecting each of at least two states using at least one read module; and
moving at least one of the at least one read module and the platter assembly with respect to the other,
wherein the platter assembly comprises at least one platter that has at least one substantially planar surface,
wherein the monolayer graphene film comprises a plurality of vacancy regions in the lattice structure of the monolayer graphene film,
wherein each vacancy region comprises one or more vacancies in the lattice structure of the monolayer graphene film, wherein each vacancy region comprises one or more sets of adjacent non-hexagonal rings forming one of a protrusion in the lattice structure and a depression in the lattice structure, wherein each protrusion is configured to represent a first of a least two possible states and each depression is configured to represent a second of the at least two possible states, and wherein the monolayer graphene film is configured to store readable data in the at least two possible states.

9. The method of claim 8, wherein the graphene film comprises a plurality of discontinuous patches of graphene, wherein each patch of graphene has a substantially unbroken hexagonal lattice structure that is not continuous with an adjacent patch of graphene.

10. The method of claim 9, further comprising mapping each of the plurality of discontinuous patches of graphene to facilitate reading the readable data stored on the graphene film.

11. The method of claim 10, wherein the mapping of each of the plurality of discontinuous patches of graphene comprises an orientation.

12. The method of claim 8, further comprising determining a location of the readable data from a data file comprising position data for one or more of the vacancy regions configured to store readable data.

* * * * *

UNITED STATES PATENT AND TRADEMARK OFFICE
CERTIFICATE OF CORRECTION

PATENT NO.        : 9,177,592 B2
APPLICATION NO.   : 14/013828
DATED             : November 3, 2015
INVENTOR(S)       : Hon Wah Chin et al.

It is certified that error appears in the above-identified patent and that said Letters Patent is hereby corrected as shown below:

IN THE CLAIMS

Column 14, line 36, claim 7: "from the lattice structure of the graphene film" should read --from the lattice structure of the monolayer graphene film--

Signed and Sealed this
Twenty-second Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 9,177,592 B2
APPLICATION NO. : 14/013828
DATED : November 3, 2015
INVENTOR(S) : Hon Wah Chin et al.

It is certified that error appears in the above-identified patent and that said Letters Patent is hereby corrected as shown below:

In the Claims

Column 14, line 45, claim 7: "to represent a first of a least two possible states" should read --to represent a first of at least two possible states--

Column 15, line 6, claim 8: "a first of a least two possible states" should read --a first of at least two possible states--

Signed and Sealed this
Twenty-first Day of June, 2016

Michelle K. Lee
*Director of the United States Patent and Trademark Office*